United States Patent
Hattori et al.

(10) Patent No.: US 7,379,104 B2
(45) Date of Patent: May 27, 2008

(54) CORRECTION APPARATUS

(75) Inventors: Yuuichirou Hattori, Kanagawa (JP); Kazuya Inou, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 718 days.

(21) Appl. No.: 10/833,766

(22) Filed: Apr. 27, 2004

(65) Prior Publication Data

US 2004/0218063 A1    Nov. 4, 2004

(30) Foreign Application Priority Data

| May 2, 2003 | (JP) | ............................. 2003-127233 |
| May 2, 2003 | (JP) | ............................. 2003-127234 |
| May 2, 2003 | (JP) | ............................. 2003-127235 |
| May 2, 2003 | (JP) | ............................. 2003-127236 |

(51) Int. Cl.
  *H04N 5/217* (2006.01)
(52) U.S. Cl. .................................. 348/241; 348/222.1
(58) Field of Classification Search ............ 348/222.1, 348/362, 364, 245, 246, 229.1, 297, 241
See application file for complete search history.

(56) References Cited

U.S. PATENT DOCUMENTS

| 5,748,307 | A  | * | 5/1998  | Nakamura et al. ........... 358/296 |
| 6,204,881 | B1 | * | 3/2001  | Ikeda et al. .................. 348/362 |
| 6,219,097 | B1 | * | 4/2001  | Kamishima et al. ........ 348/297 |
| 6,677,992 | B1 | * | 1/2004  | Matsumoto et al. ..... 348/229.1 |
| 6,791,615 | B1 |   | 9/2004  | Shiomi et al. |
| 6,906,753 | B1 | * | 6/2005  | Matoba et al. ............... 348/362 |
| 7,260,267 | B2 | * | 8/2007  | Sugimoto .................... 382/266 |
| 2001/0030770 | A1 | * | 10/2001 | Ohashi ........................ 358/465 |
| 2003/0025820 | A1 |   | 2/2003  | Miyahara |

FOREIGN PATENT DOCUMENTS

| CN | 1402355 | 3/2003 |
| JP | A 08-181917 | 7/1996 |
| JP | A 2001-094886 | 4/2001 |
| JP | A 2003-116042 | 4/2003 |

OTHER PUBLICATIONS

Chinese Office Action dated Nov. 18, 2005.

* cited by examiner

*Primary Examiner*—Lin Ye
*Assistant Examiner*—Amy Hsu
(74) *Attorney, Agent, or Firm*—Morgan & Finnegan, LLP

(57) ABSTRACT

An object of this invention is to correct the non uniformity between a plurality of image sensing regions in real time and cope with even dynamic variations such as temperature variations or variations over time. To achieve this object, a correction apparatus includes a plurality of level adjustment devices which independently adjust the levels of a plurality of image sensing signals output from a plurality of output terminals, an output level detection device which detects the output levels of the plurality of level adjustment devices, and a correction coefficient determination device which determines a correction coefficient for reducing the level difference between the image sensing signals on the basis of the detection result of the output level detection device. The correction coefficient determination device determines the correction coefficient by excluding an object-dependent level difference component in which the level difference between the plurality of image sensing signals exceeds a predetermined level difference. The correction coefficient determination device supplies the determined correction coefficient to the level adjustment devices to perform adjustment so as to reduce the level difference between the image sensing signals.

12 Claims, 32 Drawing Sheets

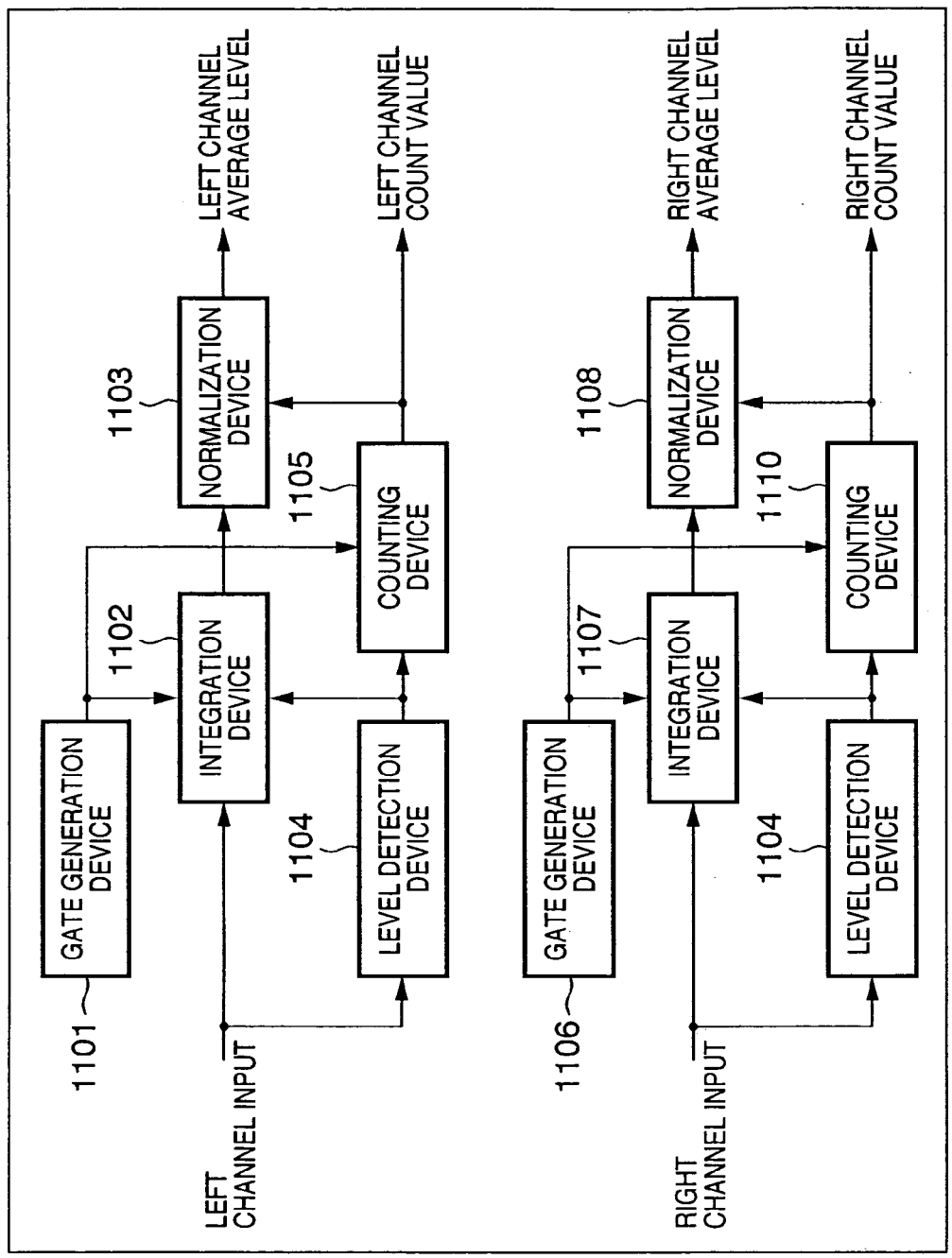
F I G. 11

CORRECTION APPARATUS

FIELD OF THE INVENTION

The present invention relates to a correction apparatus and, more particularly, to a correction apparatus which corrects a signal from a solid-state image sensing element that has an image sensing plane divided into a plurality of regions and comprises an amplifier for amplifying image sensing signals from the respective regions and a plurality of image sensing signal output terminals connected to the output of the amplifier.

BACKGROUND OF THE INVENTION

With recent development of the digital signal processing technique and semiconductor technique, there is proposed a consumer digital video standard of recording a standard television signal such as an NTSC or PAL moving picture signal as a digital signal. As its application, digital video cameras formed by integrating a digital video recording/playback apparatus and image sensing apparatus are commercially available. Some digital video cameras have a still picture recording function by exploiting the feature of digital recording.

Some digital video cameras comprise a digital I/F for connecting to a computer or the like, and have a function of capturing a photographed image into a computer. Apparatuses which comprise a plurality of recording media and can select one of them in accordance with the use purpose of an image are also put into practical use.

When such apparatus is connected to a television set to play back a recorded image, the image size is defined by the digital video standard and satisfactorily corresponds to, e.g., 720×480 pixels. To transfer an image to another medium via a digital I/F, many pixels are required in terms of the image quality.

As the number of pixels of an image sensing element increases, the image sensing element must be driven at a higher frequency in order to read out pieces of information of all pixels of the image sensing element. If pieces of information of all pixels are read out, the S/N ratio decreases and the power consumption increases.

To prevent this problem, there are proposed methods of increasing the data rate of image sensing information while suppressing the driving frequency of an image sensing element low. According to one of these methods, the image sensing plane is divided into a plurality of regions, each region is equipped with an independent charge transfer unit, amplifier, and output terminal, and image sensing signals are read out in parallel with each other.

FIG. 14 shows an example of an image sensing apparatus using the above-mentioned image sensing element. In FIG. 14, the image sensing plane of an image sensing element 1400 is divided into two, right and left regions. Reference numerals 1401 and 1402 denote photoelectric conversion/vertical transfer units; 1403 and 1404, horizontal transfer units; 1405 and 1406, amplifiers; and 1407 and 1408, output terminals. The image sensing element having this structure can provide image sensing information at a data rate twice as high as the driving frequency of the image sensing element.

The drawback of this method is degradation in image quality such that, when two regions are synthesized to generate an image, a boundary line is generated by the level difference between the regions owing to the non uniformity between the characteristics of the amplifiers and external peripheral circuits in these regions.

As a method of reducing degradation in image quality caused by the non uniformity, the black levels and white levels of regions are measured in advance to obtain correction coefficients. In sensing an image, the non uniformity is corrected using the correction coefficients.

FIG. 14 shows an arrangement example of the correction circuit. An object image formed on the image sensing element 1400 by an imaging optical system (not shown) is converted into electrical signals by the image sensing element 1400. The electrical signals are output from the output terminals 1407 and 1408 in response to a driving pulse supplied from a driving timing generation circuit (not shown).

Two image signals obtained by the image sensing element 1400 are subjected to an analog signal process and A/D-converted by analog signal processors 1409 and 1410. The digital signals are supplied to black level correction circuits 1411 and 1412 and a black level difference detection circuit 1413. The black level difference detection circuit 1413 detects the difference between black levels from the two image signals, and calculates a correction coefficient.

The correction coefficient is supplied to the black level correction circuits 1411 and 1412 to correct the black level difference on the basis of the correction coefficient. Detection of the black level difference uses a signal from the optical black pixel of the image sensing element 1400. Detection and correction value calculation are executed only once in a predetermined period, and an obtained correction coefficient is stored in a memory 1420. In subsequent image sensing, the black level difference is corrected using the correction coefficient stored in the memory 1420 without performing any detection.

The signals are then supplied to white level correction circuits 1414 and 1415 and a white level difference detection circuit 1416. The white level difference detection circuit 1416 detects the difference between white levels from the two image signals, and calculates a correction coefficient. The correction coefficient is supplied to the white level correction circuits 1414 and 1415 to correct the white level difference on the basis of the correction coefficient.

In detecting the white level difference, the image sensing element 1400 is irradiated with uniform light which provides a standard white level, and an attained image signal is used. Detection and correction value calculation are executed only once in a predetermined period, and an obtained correction coefficient is stored in a memory 1421. In subsequent image sensing, the white level difference is corrected using the correction coefficient stored in the memory 1421 without performing any detection.

A frame synthesizing circuit 1417 synthesizes right and left images into one image on the basis of the signals having undergone white level correction. A camera signal processing circuit 1418 performs a γ correction process, edge correction process, color correction process, and the like. The resultant signals are output as a luminance signal and color difference signals from an output terminal 1419.

However, in the prior art, correction cannot be performed in real time because the correction coefficient is calculated only under predetermined conditions such that a standard white image is sensed. The prior art cannot cope with dynamic variations such as temperature variations or variations over time, or variations in the focusing degree of the image sensing optical system, failing to sufficiently correct the non uniformity between regions.

Also, the prior art cannot quickly cope with dynamic variations such as the shake of an image sensing apparatus, and cannot satisfactorily correct the non uniformity between regions.

SUMMARY OF THE INVENTION

The present invention has been made to overcome the above drawbacks, and has as its object to cope with even dynamic variations such as temperature variations or variations over time and correct the non uniformity between a plurality of image sensing regions in real time by excluding an object-dependent level difference component and determining a correction coefficient.

It is another object of the present invention to correct the non uniformity between a plurality of image sensing regions in real time in consideration of temperature variations in or around the image sensing element.

It is still another object of the present invention to correct the non uniformity between a plurality of image sensing regions in real time and cope with even dynamic variations such as temperature variations, variations over time, or variations in the focusing degree of an image sensing optical system.

It is still another object of the present invention to quickly cope with dynamic variations such as the shake of an image sensing apparatus and correct the non uniformity between a plurality of image sensing regions in real time.

To solve the above problem and achieve the above object, according to a first aspect of the present invention, there is provided a correction apparatus which corrects a plurality of image sensing signals from a plurality of output portions of an image sensing element, comprising:

a level adjustment device which adjusts levels of the plurality of image sensing signals; and a correction coefficient determination device which determines a correction coefficient for reducing a level difference between the plurality of image sensing signals, wherein the correction coefficient determination device corrects an object-dependent level difference component to determine the correction coefficient, and supplies the determined correction coefficient to the level adjustment device to perform adjustment so as to reduce the level difference between the image sensing signals.

To solve the above problem and achieve the above object, according to a second aspect of the present invention, there is provided a correction method of correcting a plurality of image sensing signals from a plurality of output portions of an image sensing element, comprising:

a level adjustment process of adjusting levels of the plurality of image sensing signals; and a correction coefficient determination process of determining a correction coefficient for reducing a level difference between the plurality of image sensing signals, wherein in the correction coefficient determination process, an object-dependent level difference component is corrected to determine the correction coefficient, and the determined correction coefficient is supplied to the level adjustment process to perform adjustment so as to reduce the level difference between the image sensing signals.

To solve the above problem and achieve the above object, according to a third aspect of the present invention, there is provided a correction apparatus which corrects a plurality of image sensing signals from a plurality of output portions of an image sensing element, comprising:

a level adjustment device which adjusts levels of the plurality of image sensing signals; and a correction coefficient determination device which determines a correction coefficient for reducing a level difference between the plurality of image sensing signals on the basis of temperature information, wherein the correction coefficient determined by the correction coefficient determination device is supplied to the level adjustment device to perform adjustment so as to reduce the level difference between the image sensing signals.

To solve the above problem and achieve the above object, according to a fourth aspect of the present invention, there is provided a correction method of correcting a plurality of image sensing signals from a plurality of output portions of an image sensing element, comprising:

a level adjustment process of adjusting levels of the plurality of image sensing signals; and a correction coefficient determination process of determining a correction coefficient for reducing a level difference between the plurality of image sensing signals on the basis of temperature information, wherein the correction coefficient determined in the correction coefficient determination process is supplied to the level adjustment process to perform adjustment so as to reduce the level difference between the image sensing signals.

To solve the above problem and achieve the above object, according to a fifth aspect of the present invention, there is provided a correction apparatus which corrects a plurality of image sensing signals from a plurality of output portions of an image sensing element, comprising:

a level adjustment device which adjusts levels of the plurality of image sensing signals; and a correction coefficient determination device which determines a correction coefficient for reducing a level difference between the plurality of image sensing signals on the basis of a focusing degree of an imaging optical system for forming an object image on the image sensing element, wherein the correction coefficient determined by the correction coefficient determination device is supplied to the level adjustment device to perform adjustment so as to reduce the level difference between the image sensing signals.

To solve the above problem and achieve the above object, according to a sixth aspect of the present invention, there is provided a correction method of correcting a plurality of image sensing signals from a plurality of output portions of an image sensing element, comprising:

a level adjustment process of adjusting levels of the plurality of image sensing signals; and a correction coefficient determination process of determining a correction coefficient for reducing a level difference between the plurality of image sensing signals on the basis of a focusing degree of an imaging optical system for forming an object image on the image sensing element, wherein the correction coefficient determined in the correction coefficient determination process is supplied to the level adjustment process to perform adjustment so as to reduce the level difference between the image sensing signals.

To solve the above problem and achieve the above object, according to a seventh aspect of the present invention, there is provided a correction apparatus which corrects a plurality of image sensing signals from a plurality of output portions of an image sensing element, comprising:

a level adjustment device which adjusts levels of the plurality of image sensing signals; and a correction coefficient determination device which determines a correction coefficient for reducing a level difference between the plurality of image sensing signals on the basis of a detection result of a shake amount of an image sensing apparatus including the image sensing element, wherein the correction coefficient determined by the correction coefficient determination device is supplied to the level adjustment device to perform adjustment so as to reduce the level difference between the plurality of image sensing signals.

To solve the above problem and achieve the above object, according to a eighth aspect of the present invention, there is provided a correction method of correcting a plurality of image sensing signals from a plurality of output portions of an image sensing element, comprising:

a level adjustment process of adjusting levels of the plurality of image sensing signals; and a correction coefficient determination process of determining a correction coefficient for reducing a level difference between the plurality of image sensing signals on the basis of a detection result of a shake amount of an image sensing apparatus including the image sensing element, wherein in the level adjustment process, the correction coefficient determined in the correction coefficient determination process is used to perform adjustment so as to reduce the level difference between the plurality of image sensing signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a block diagram showing the third embodiment and showing an arrangement example of a level difference evaluation value generation device;

DETAILED DESCRIPTION OF THE PREFERRED EMBODIMENTS

Preferred embodiments in which correction of the present invention is applied to an image sensing apparatus will be described below with reference to the accompanying drawings.

First Embodiment

Figure 1:
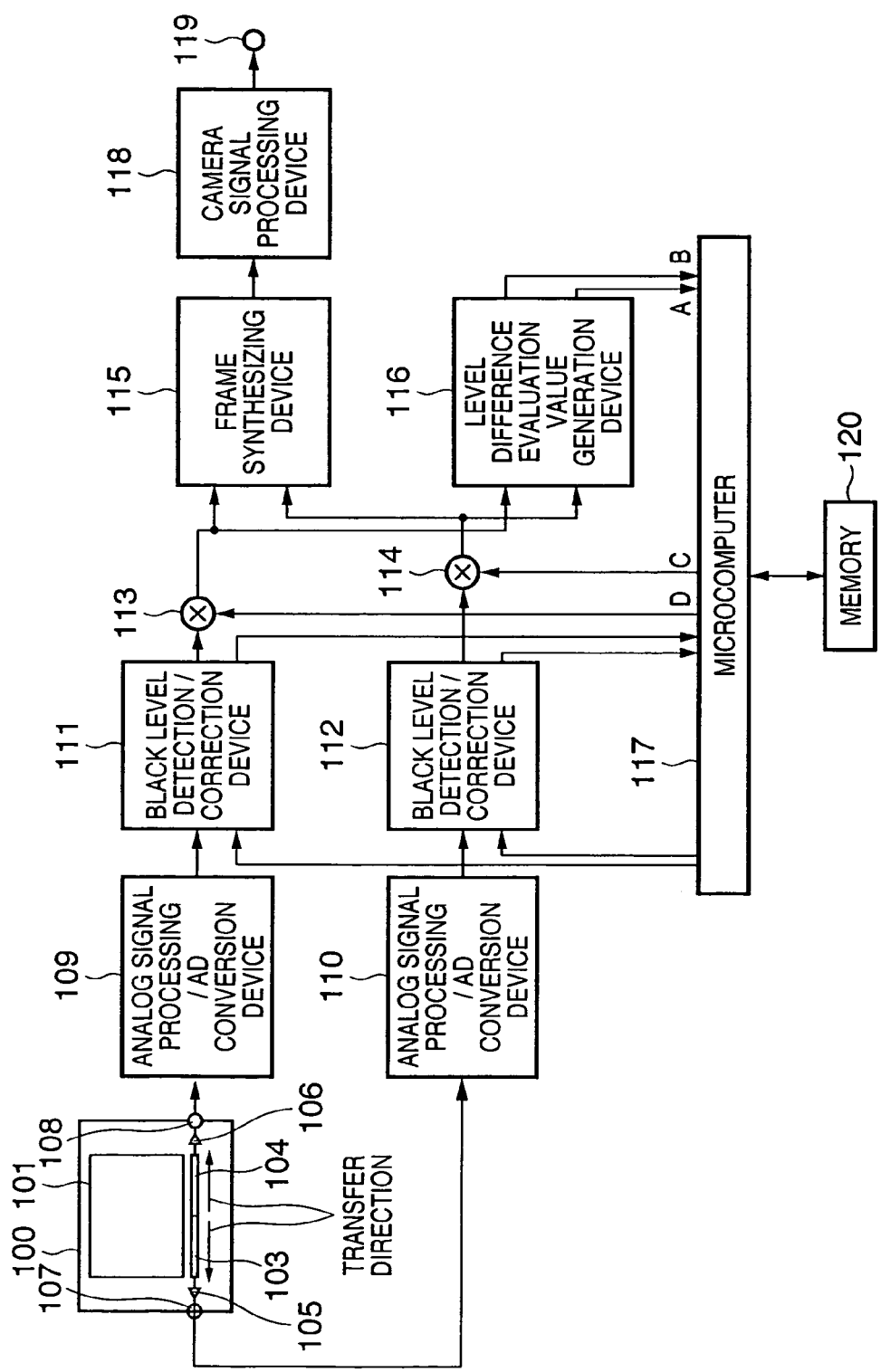
FIG. 1 is a block diagram showing the first embodiment of the present invention and showing the arrangement of the first embodiment in which a correction apparatus according to the present invention is applied to a video camera.

FIG. 1 is a block diagram schematically showing an embodiment in which a correction apparatus according to the present invention is applied to a single-CCD video camera.

In FIG. 1, reference numeral 100 denotes a CCD area sensor in which the image sensing region is divided into two and each region has an output terminal; 101, a photoelectric conversion/vertical transfer unit; and 103 and 104, horizontal transfer units which are arranged in left and right directions using the center of the screen as a boundary.

Reference numerals 105 and 106 denote output amplifiers which amplify signal charges; and 107 and 108, image sensing signal output terminals. Reference numerals 109 and 110 denote analog front ends which perform correlated double sampling and A/D conversion. Reference numerals 111 and 112 denote black level detection/correction devices; 113 and 114, gain adjustment devices which adjust the gain; and 115, a frame synthesizing device which synthesizes two image signals to generate one image.

Reference numeral 116 denotes a level difference evaluation value generation device for detecting the non uniformity between two systems; 117, a microcomputer which controls the system; 118, a camera signal processing device; 119, an output terminal; and 120, a rewritable nonvolatile memory. In the first embodiment and the following embodiments, the gain adjustment devices 113 and 114, level difference evaluation value generation device 116, and microcomputer 117 form a correction apparatus for detecting and correcting the non uniformity between the two systems.

The operation of a video camera in the first embodiment with the above arrangement will be explained.

An object image formed on the CCD 100 by an imaging optical system (not shown) is converted into an electrical signal by the photoelectric conversion unit 101. The signal is divided into two signals by the horizontal transfer paths 103 and 104, and the two signals are supplied to the output amplifiers 105 and 106.

Signal charges are amplified to a predetermined level by the output amplifiers 105 and 106, and output from the first output terminal 107 and second output terminal 108. An image sensing signal obtained from the first output terminal 107 will be called a left channel signal, and an image sensing signal obtained from the second output terminal 108 will be called a right channel signal.

The two, right and left image sensing signals are subjected to a correlated double sampling process and A/D-converted by the analog front ends 109 and 110, and then supplied to the black level detection/correction devices 111 and 112. The black level detection/correction devices 111 and 112 perform black level correction so as to make the black levels of two image sensing signals correspond to a digital code "0" by using dummy signal portions or optical black signal portions out of the image sensing signals. As a result, the error of an offset component between the two systems is removed.

The signals having the corrected black levels undergo gain adjustment by the gain adjustment devices 113 and 114. The gain applied in gain adjustment is supplied from the microcomputer 117. In a conventional image sensing apparatus, the gain of a signal amount in a low-illuminance environment is increased by an analog circuit. In an image sensing apparatus which processes two image sensing signals, like the first embodiment, gain adjustment by an analog circuit may become a factor of the non uniformity between the two systems. Hence, in the first embodiment, gain adjustment is done by digital calculation using the gain adjustment devices 113 and 114, eliminating the influence of circuit variations, variations over time, and temperature variations.

The gain adjustment devices 113 and 114 execute not only gain adjustment for the image brightness but also correction of the gain error between the two systems. In general, the gain difference between two systems depends on the output level of the CCD area sensor 100.

Figure 3:
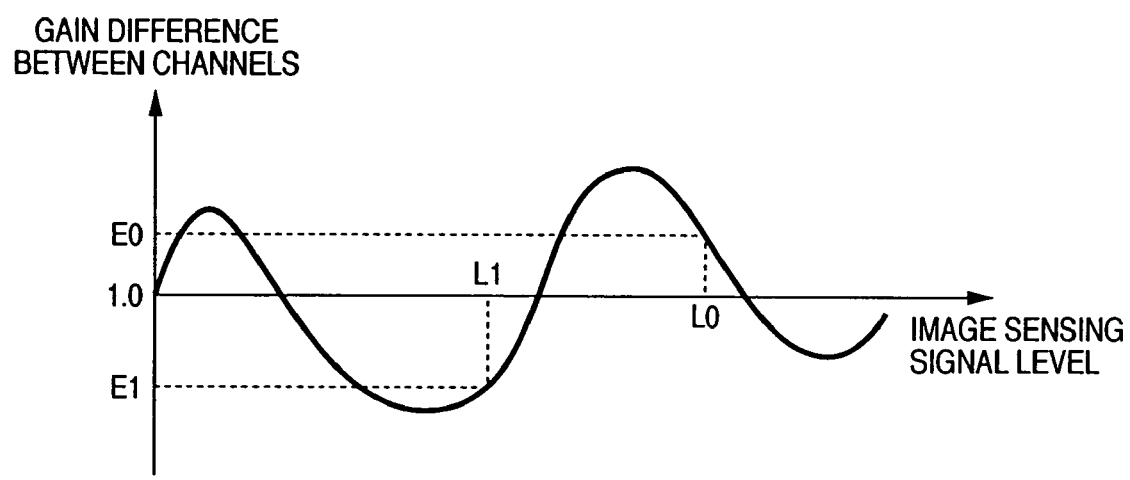
FIG. 3 is a graph showing the CCD output level and the gain difference between channels.

FIG. 3 is a graph showing an example of the output level between two systems and the gain difference between channels. In FIG. 3, the abscissa represents the left channel output level of the CCD 100, and the ordinate represents the ratio of the input signal (left channel) of the gain adjustment device 114 and the input signal (right channel) of the gain adjustment device 113, i.e., the gain difference in signal level between the two systems.

For example, letting L0 be the left channel output level of the CCD 100 and L0right be the right channel output level when an object with a given brightness is sensed, a gain difference E0 is given by $$E0 = L0right/L0 \quad (1)$$

As shown in FIG. 3, the relationship between the signal level and the gain difference is not constant. The gain correction amount is not a fixed value, but must be changed in accordance with the gain-up amount.

In the first embodiment, a reference level Lref is set for a signal after gain adjustment, and gain correction is done such that the level difference between two systems is always 0 regardless of the gain-up amount, i.e., the signal of each channel coincides with the reference level Lref. As the reference level Lref, a gray level of about 75% after γ correction for the reference white level is selected.

For example, when the gain-up amount makes the output level of the gain adjustment device 114 coincide with the reference level Lref at the left channel output level L0 of the CCD 100, a gain A0 applied to the left channel gain adjustment device 114 is given by $$A0 = \text{reference level } Lref/L0 \quad (2)$$

At this time, letting C0 be the gain correction amount, a gain A0right applied to the right channel gain adjustment device 113 is given by $$A0right = A0 \times C0 \quad (3)$$

C0 is given by $$C0 = 1.0/E0 \quad (4)$$

Similarly, when the gain-up amount makes the output level of the gain adjustment device 114 coincide with the reference level Lref at the left channel output level L1 of the CCD 100, a gain correction amount C1 is given by $$C1 = 1.0/E1 \quad (5)$$

Figure 4:
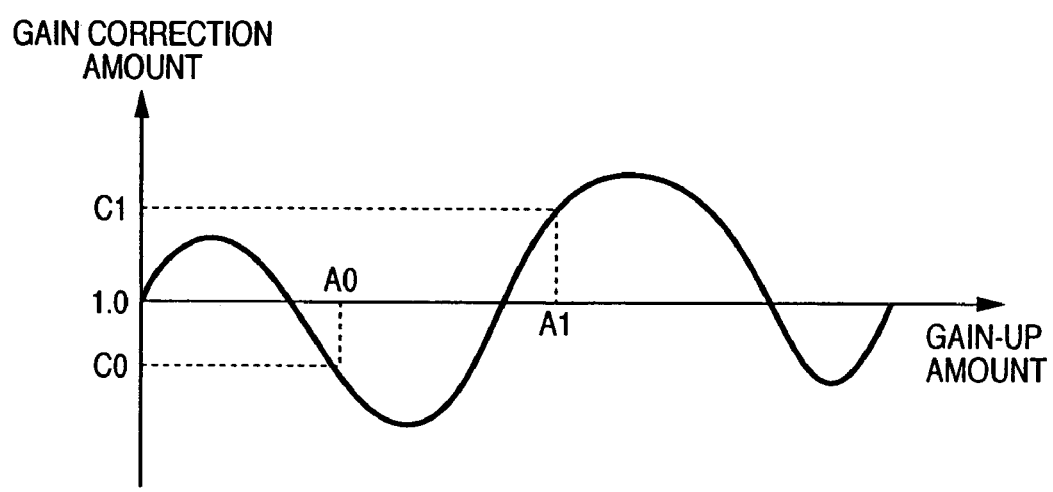
FIG. 4 is a graph showing the gain correction characteristic to the gain-up amount.

FIG. 4 shows an example of the characteristic of the gain correction amount to the gain-up amount. The correction characteristic changes depending on the component of the CCD 100 or those of the analog front ends 109 and 110.

Measurement of the gain correction characteristic will be described.

The level difference evaluation value generation device 116 calculates a frame level difference evaluation value on the basis of a pixel value within a rectangular region designated near the boundary between divided regions, and outputs the calculated value to the microcomputer 117.

Figure 2:
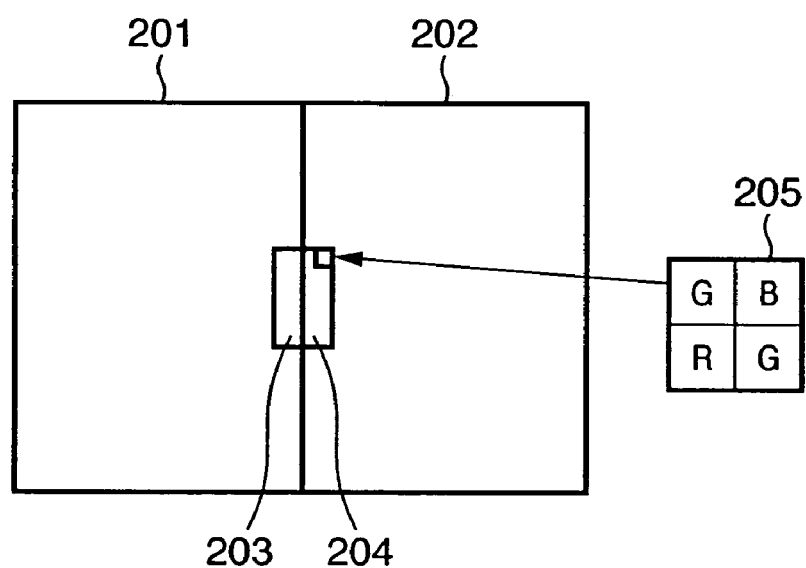
FIG. 2 is a view showing a rectangular region at the boundary between divided frames.

FIG. 2 shows an example of rectangular regions within the screen. As shown in FIG. 2, rectangular regions 203 and 204 are set near the boundary between two divided regions 201 and 202. Pixel values within the rectangular regions are used to evaluate a frame level difference.

In the CCD 100, an on-chip color filter is adhered to the pixel portion in order to sense a color image by a single CCD. The on-chip color filter has, e.g., a layout 205 in FIG. 2. The level difference evaluation value generation device 116 selects pixel values of one color, calculates an average value within the region, and defines it as a frame level difference evaluation value.

In measuring the gain correction characteristic, an object with a uniform brightness is sensed, and the microcomputer 117 sets the same gain multiplier for the gain adjustment devices 113 and 114. The average level of pixels within one rectangular region 203 is set as the level of the left channel, and the average level of pixels within the other rectangular region 204 is set as the level of the right channel, outputting the set levels to the microcomputer 117.

The microcomputer 117 calculates the gain correction amount of the right channel in the above-described manner by using the level of the left channel as a reference. This measurement is executed at a predetermined interval at the output level of the CCD 100, thereby generating a gain correction characteristic.

The microcomputer 117 stores the generated gain correction characteristic in the rewritable nonvolatile memory 120 such as an EEPROM (Electrically Erasable Programmable Read Only Memory). Generation of the gain correction characteristic is executed in factory adjustment or the like. Hence, dynamic variations such as variations over time or temperature variations cannot be coped with, and the gain difference remains as an error.

Correction of the remaining gain error in general photographing will be explained.

Figure 5:
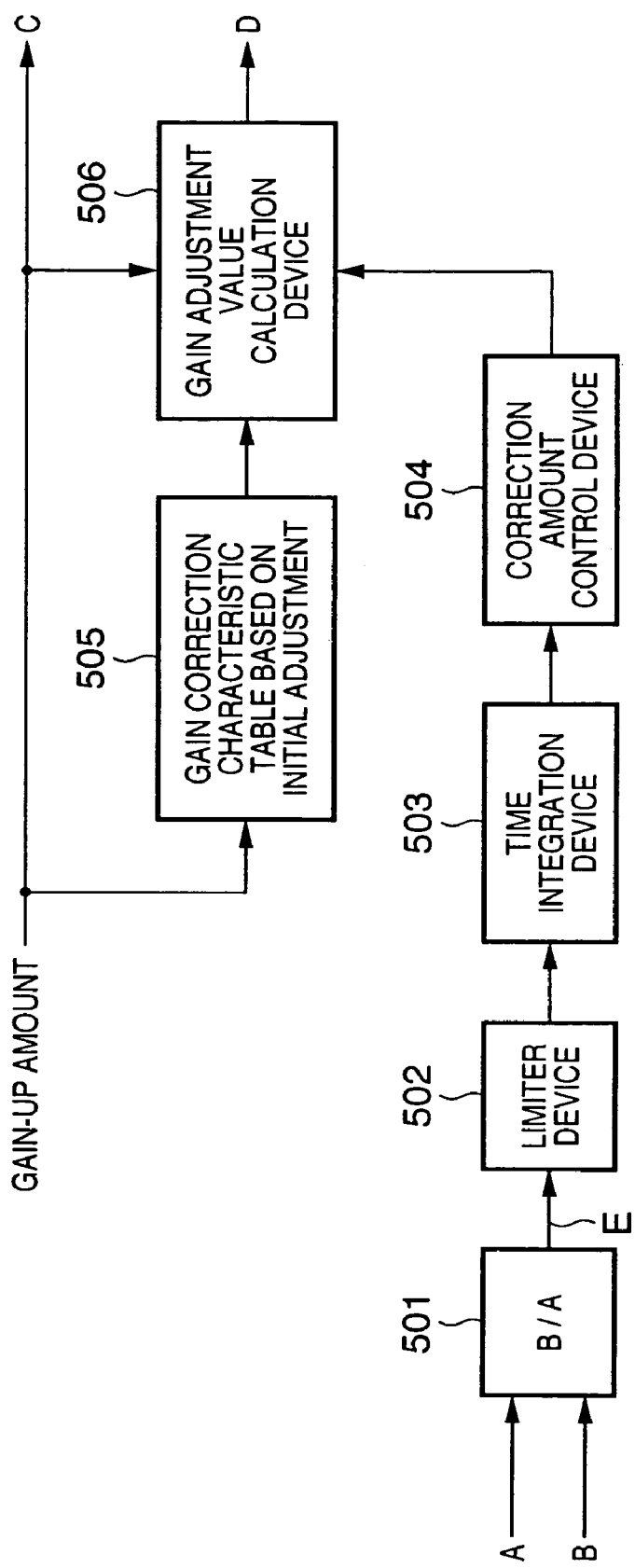
FIG. 5 is a block diagram showing an arrangement example of a device which executes a gain adjustment value calculation sequence in the first embodiment.

FIG. 5 shows the arrangement of a block for remaining gain error correction executed by the microcomputer 117 serving as a correction coefficient determination device which corrects an object-dependent level difference component to determine a correction coefficient, and supplies the determined correction coefficient to the gain adjustment device to perform adjustment so as to reduce the level difference between image sensing signals output from different output terminals of the CCD area sensor. Signals A, B, C, and D in FIG. 5 correspond to signals A, B, C, and D in FIG. 1. Reference symbol A denotes a left channel level difference evaluation value; B, a right channel level difference evaluation value; C, a left channel gain adjustment value; and D, a right channel gain adjustment value.

The left channel level difference evaluation value A and right channel level difference evaluation value B input to the microcomputer 117 are input to a gain error calculation device 501 to calculate a gain error amount E. The gain error amount E is given by $$E=B/A \quad (6)$$

The gain error amount E calculated by the gain error calculation device 501 is merely the ratio of pixel levels, and is influenced by the non uniformity between channels and also an object-dependent level difference. To perform accurate gain error correction, an object-dependent level difference component must be excluded. In the first embodiment, the object-dependent level difference component is excluded by a limiter device 502 and integration device 503.

Figure 6:
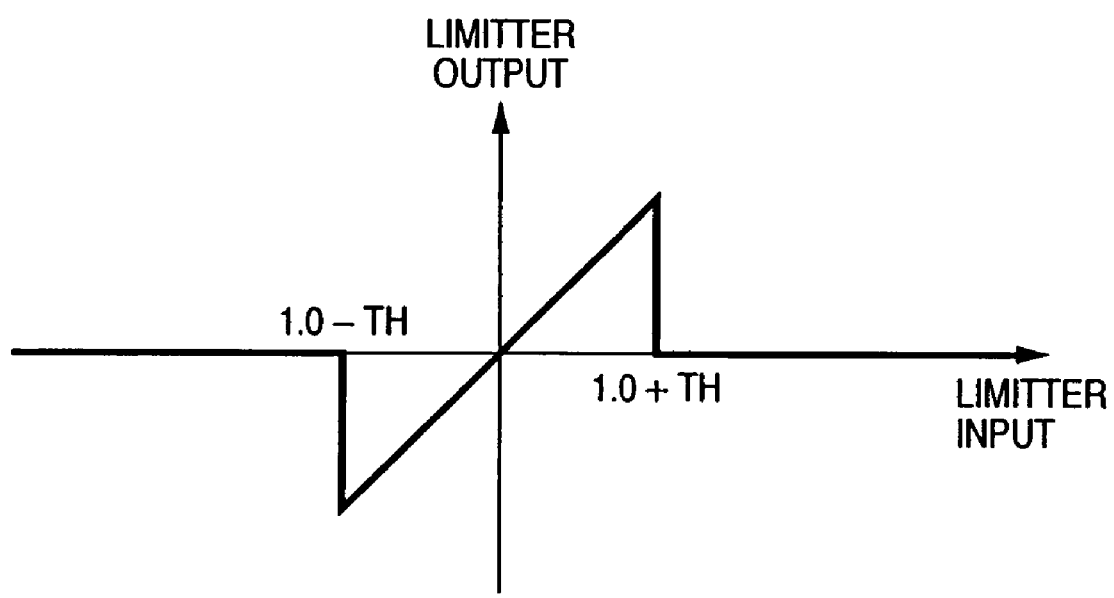
FIG. 6 is a graph showing the input/output characteristic of a limitter in the first embodiment.

FIG. 6 shows the input/output characteristic of the limiter device 502. The origin in FIG. 6 represents a point at which the limiter input=the limiter output=1.0. Because of the level ratio of channels, the value is 1.0 in the absence of any gain error.

When the level difference ratio exceeds a threshold TH, the limiter output becomes 1.0, as shown in FIG. 6. The threshold TH is determined in correspondence with the remaining gain error amount. In this process, a large level difference is regarded as an object-dependent level difference and excluded.

Figure 7:
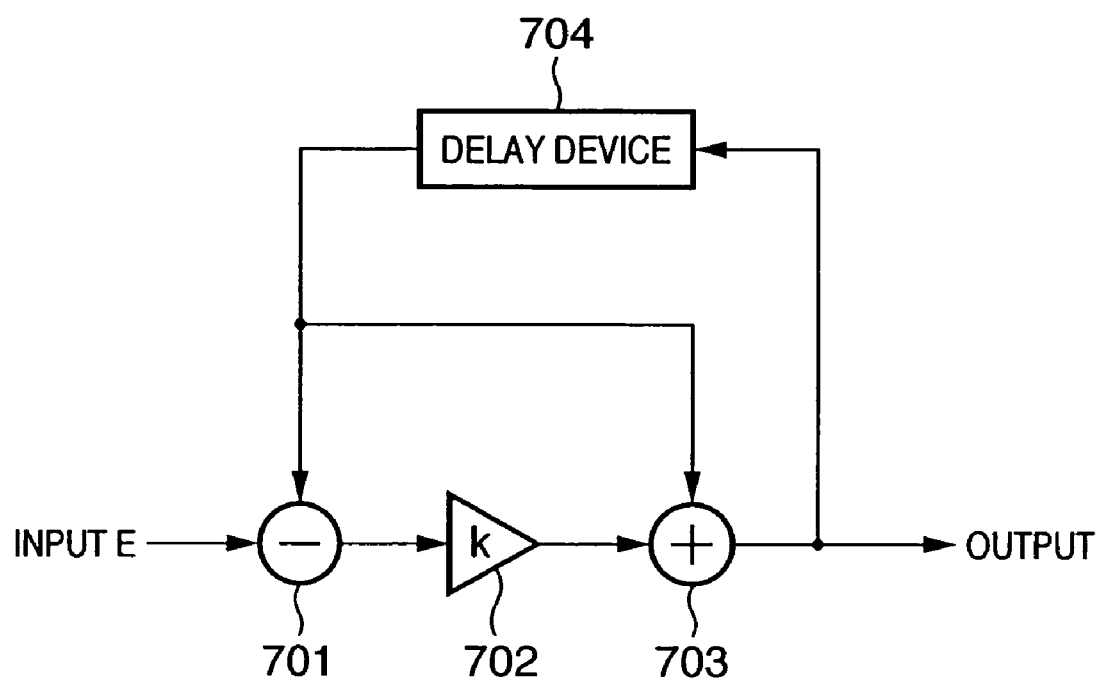
FIG. 7 is a block diagram showing an arrangement example of an integration device in the first embodiment.

FIG. 7 shows the internal arrangement of the integration device 503. The difference between an input signal X(0) and a signal Y(−1) delayed by a predetermined time is calculated by a subtraction device 701, and the difference is multiplied by a coefficient k by a coefficient unit 702. An output from the coefficient unit 702 is added to a delay signal by an addition device 703 to output the sum and also supply it to a delay device 704. An output signal Y(0) is given by $$Y(0)=kX(0)+(1-k)Y(-1)(0<k<1) \quad (7)$$

The delay time is equal to the CCD vertical scanning period. This process provides the average value of the error amounts of past 1/k frames. In general, the object is not fixed within the angle of view for a long time, and thus the average of a plurality of frames is calculated to cancel and exclude an object-dependent level difference component.

By the above process, an object-dependent level difference is excluded, and a gain error generated by the non uniformity between channels is extracted. The gain error amount is multiplied by a coefficient by a correction amount control device 504. This coefficient corresponds to the feedback gain of the gain error correction loop. For a large gain, the correction ability is high, but the operation is unstable against disturbance such as erroneous detection. For a small gain, the operation is stable against disturbance, but the correction ability is low.

An output from the correction amount control device 504 is supplied to a gain correction amount calculation device 506.

The gain correction amount calculation device 506 also receives an output from a gain correction characteristic table 505. The gain correction characteristic table 505 is a table of gain correction characteristics described above. As illustrated in FIG. 4, a gain correction amount is obtained in correspondence with the gain-up amount.

The gain correction amount calculation device 506 multiplies these two input signals and the gain-up amount to actually calculate a gain adjustment value for the right channel. The calculated gain adjustment value is supplied to the gain adjustment device 113 shown in FIG. 1. The gain adjustment device 114 receives the gain-up amount.

Signals after gain adjustment are supplied to the frame synthesizing device 115 and level difference evaluation value generation device 116. The frame synthesizing device 115 synthesizes two signals and outputs the synthesized signal as an image of one frame to the camera signal processing circuit 118. The camera signal processing circuit 118 executes signal processes such as γ correction, color correction, and edge correction, and outputs the resultant signal as an image signal from the terminal 119.

Second Embodiment

Figure 8:
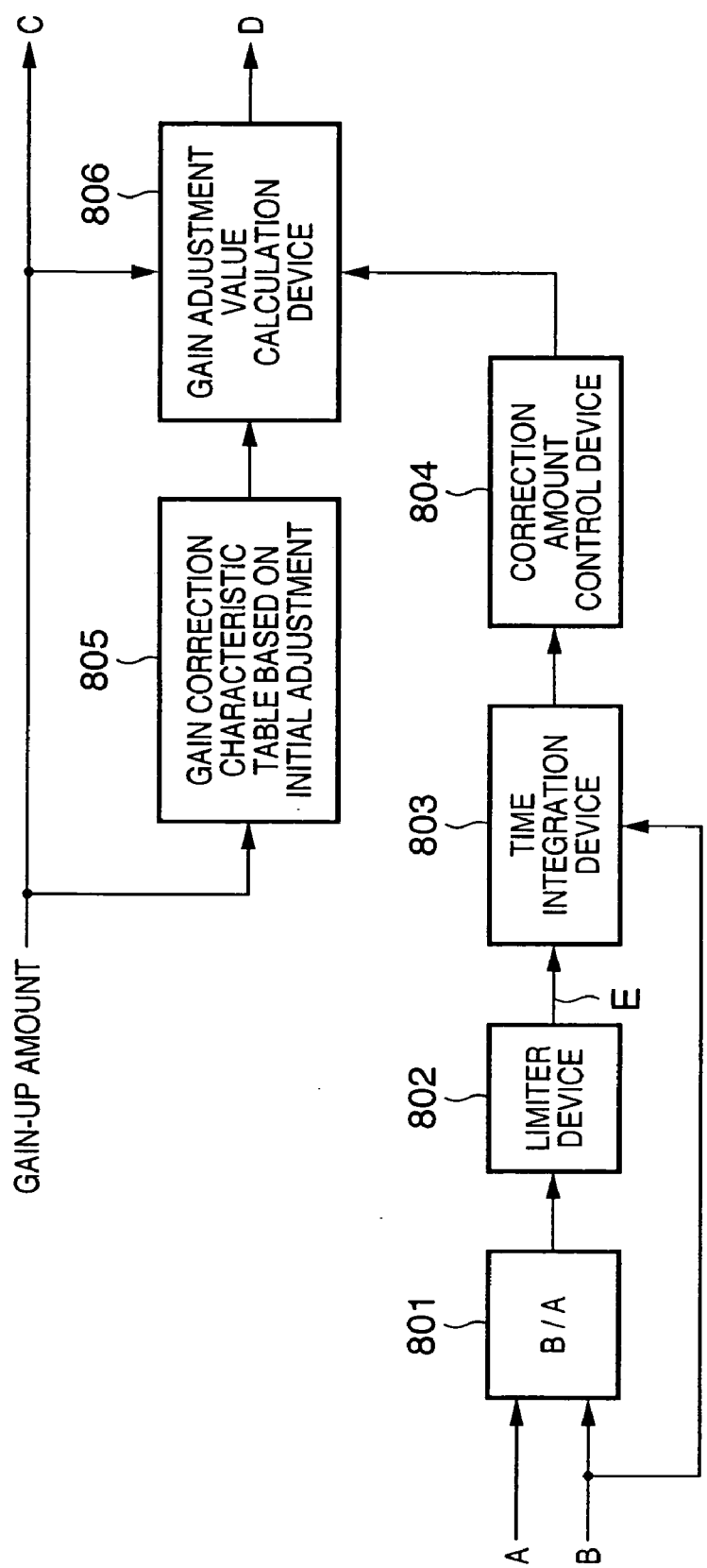
FIG. 8 is a block diagram showing the second embodiment and showing an arrangement example of a device which executes a gain adjustment value calculation sequence.

FIG. 8 is a signal processing block diagram for explaining a correction apparatus according to the second embodiment of the present invention. The detailed arrangement of an overall image sensing apparatus is the same as that in the first embodiment. Signal processes shown in FIG. 8 are executed within a microcomputer 117 in FIG. 1. Also, a rectangular region for evaluation value measurement is the same as that in the first embodiment.

The gain error between two systems is not constant for the output level of a CCD 100, as shown in FIG. 3. A natural image in general photographing contains objects with various brightnesses. If the gain error is measured from a general natural image, a value obtained by multiplying the gain error characteristic curve shown in FIG. 3 by a brightness distribution frequency within a rectangular region and integrating the product is obtained, failing to calculate an accurate gain error amount. To prevent this, the second embodiment considers the image brightness in calculation of the gain error amount.

A left channel level difference evaluation value A and right channel level difference evaluation value B input to the microcomputer 117 are input to a gain error calculation device 801 to calculate a gain error amount. The arrangements and operations of the gain error calculation device 801 and a limiter device 802 are the same as those in the first embodiment, and a description thereof will be omitted.

Figure 9:
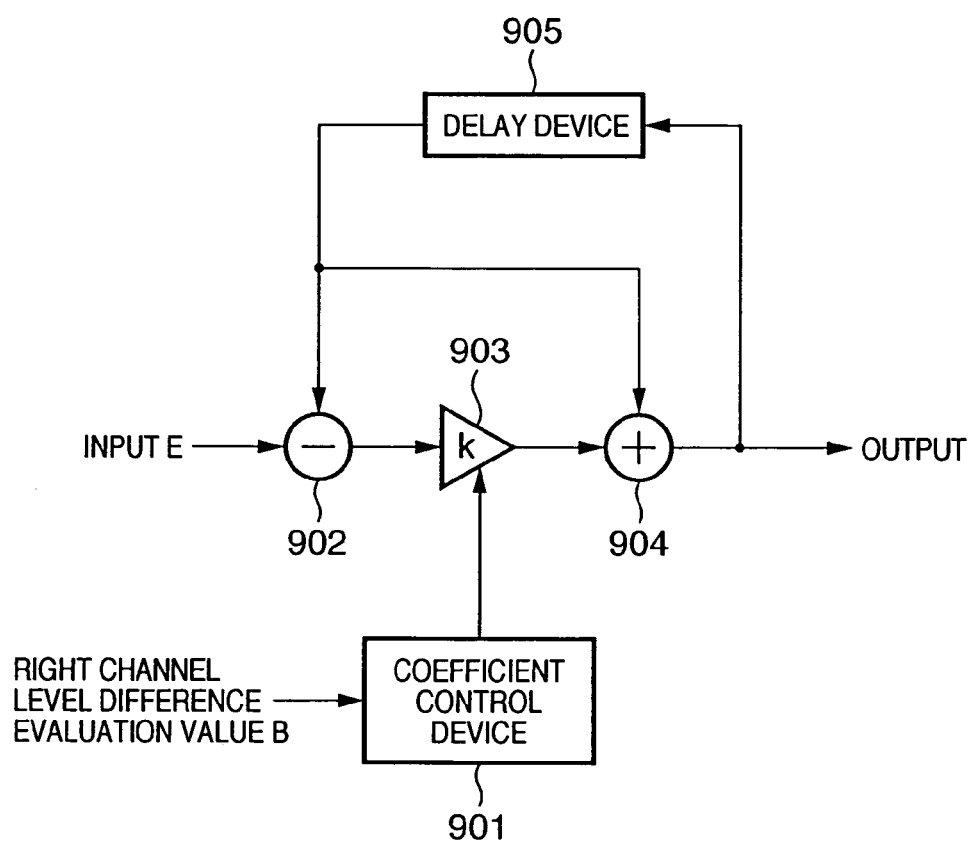
FIG. 9 is a block diagram showing an arrangement example of an integration device in the second embodiment.

An output from the limiter device 802 is input to an integration device 803. The integration device 803 also simultaneously receives the right channel level difference evaluation value B. FIG. 9 shows the internal arrangement of the integration device 803. The arrangement and operation except for a coefficient control device 901 are the same as those in the first embodiment. More specifically, reference numeral 902 in FIG. 9 corresponds to the subtraction device 701 in FIG. 7; 903, to the coefficient unit 702 in FIG. 7; 904, to the addition device 703 in FIG. 7; and 905, to the delay device 704 in FIG. 7.

Figure 10:
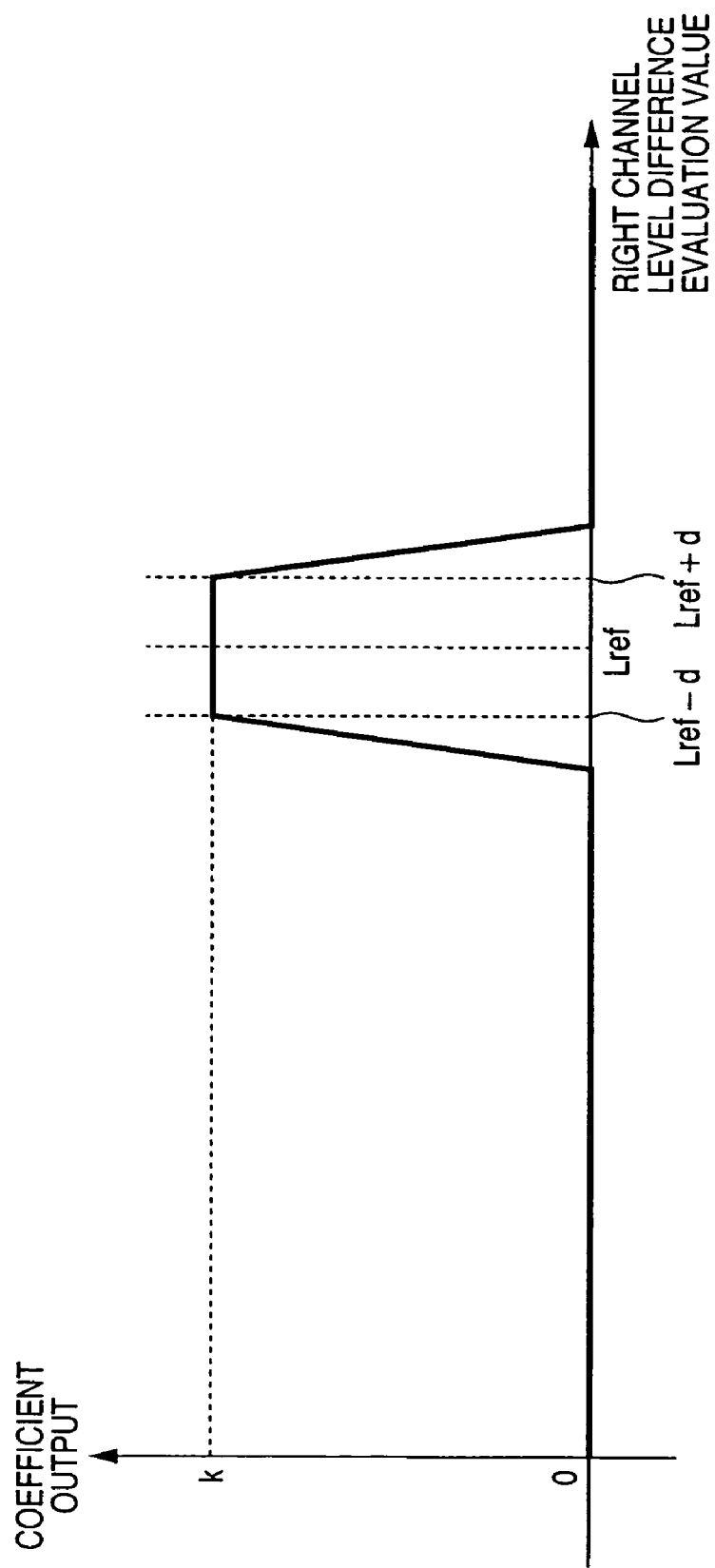
FIG. 10 is a graph showing the coefficient control characteristic in the second embodiment.

FIG. 10 shows the coefficient control characteristic of the coefficient control device 901. In FIG. 10, the abscissa represents the right channel level difference evaluation value B, and the ordinate represents a coefficient supplied to the coefficient unit 903. The reference level Lref in the graph is a reference level described in measurement of the gain correction characteristic according to the first embodiment.

When the right channel level difference evaluation value falls within the range of a threshold d centered on the reference level, the output coefficient takes a predetermined value k. If the value deviates from this level, 0 is output. An intermediate value of 0 to k is output near the threshold in order to prevent unstable operation caused by an abrupt change in coefficient.

By this coefficient control, the evaluation value is integrated only when the image brightness is close to the reference level, and a value deviated from the reference level is excluded from integration targets. As a result, correction of a remaining error upon dynamic variations can be achieved at high precision at the reference level in initial adjustment.

An output from the integration device 803 is multiplied by a coefficient by a correction amount control device 804. The operations of the correction amount control device 804, a gain correction characteristic table 805, and a gain correction amount calculation device 806 are the same as those in the first embodiment.

Referring back to FIG. 1, an obtained left channel gain adjustment value C and right channel gain adjustment value D are respectively supplied to gain adjustment devices 114 and 113.

Third Embodiment

FIG. 11 is a block diagram showing the third embodiment of the present invention and showing an arrangement example of an apparatus which performs signal processes in an image sensing apparatus. The detailed arrangement of the whole image sensing apparatus is the same as that in the first embodiment. FIG. 11 shows an arrangement example of a level difference evaluation value generation device 116 in FIG. 1. A rectangular region for evaluation value measurement is the same as that in the first embodiment.

As described above, the gain error between two systems is not constant for the output level of a CCD 100. If the level difference is measured from a general natural image, no accurate gain error amount may be calculated. To prevent this, the third embodiment considers the image brightness.

Outputs from gain adjustment devices 113 and 114 correspond to a left channel input and right channel input in FIG. 11, respectively. Since the right and left channels have a common arrangement and operation, the left channel will be explained.

A left channel input is input to an integration device 1102 (1107) and level detection device 1104 (1109). The integration device 1102 (1107) fetches the input signal into an integrator only when both a gate signal generated by a gate generation device 1101 (1106) and a level detection signal generated by the level detection device 1104 (1109) are "true". When either the gate signal or level detection signal is "false", the integration device 1102 (1107) does not fetch any input signal into the integrator.

The gate generation device 1101 (1106) operates in synchronism with horizontal scanning and vertical scanning of an image signal. When the color filter exhibits a desired color state during a period corresponding to a rectangular region 203 shown in FIG. 2, an output from the gate generation device 1101 (1106) becomes "true"; otherwise, "false". With this signal, only an input signal of one color within the rectangular region is selected as an integration target.

When the input signal is larger than a lower limit level Llim and smaller than an upper limit level Ulim, an output from the level detection device 1104 (1109) becomes "true"; otherwise, "false". With this signal, an input signal is selected as an integration target only when the input signal falls within the range of the reference level. The lower limit level Llim and upper limit level Ulim are set with a margin (e.g., ±5%) proper to the reference level Lref described in measurement of the gain correction characteristic according to the first embodiment.

Based on these signals, only a signal which corresponds to a desired color within the rectangular region of the input signal and has a level within the reference range is selected as an integration target. The gate signal and level detection signal are input to a pixel counting device 1105 (1110). The pixel counting device resets the count at the start of the rectangular region, and when both the gate signal and level detection signal are "true", is incremented. A counter output represents the number of integrated input signals.

Outputs from the integration device 1102 and pixel counting device 1105 (1110) are supplied to a normalization device 1103 (1108). The normalization device 1103 (1108) divides an integrated signal by a counter output to calculate an average value. The calculated average value and counter output are output as left channel level difference evaluation values to a microcomputer 117.

Figure 12:
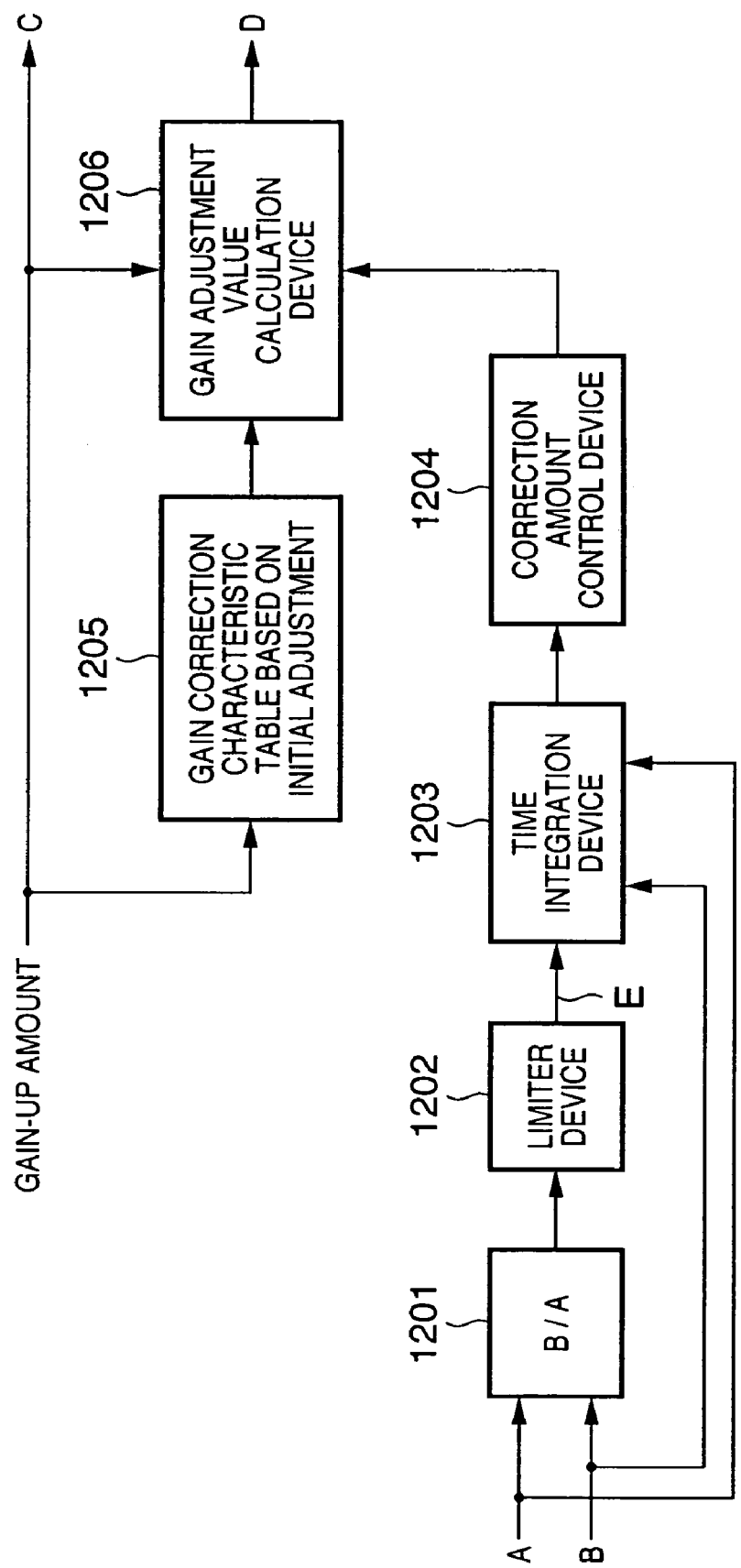
FIG. 12 is a block diagram showing an arrangement example of a device which executes a gain adjustment value calculation sequence in the third embodiment.

FIG. 12 is a block diagram of signal processes executed by the microcomputer 117. A left channel level difference evaluation value A and right channel level difference evaluation value B input to the microcomputer 117 are input to a gain error calculation device 1201 to calculate a gain error amount. The arrangements and operations of the gain error calculation device 1201 and a limiter device 1202 are the same as those in the first embodiment, and a detailed description thereof will be omitted.

Figure 13:
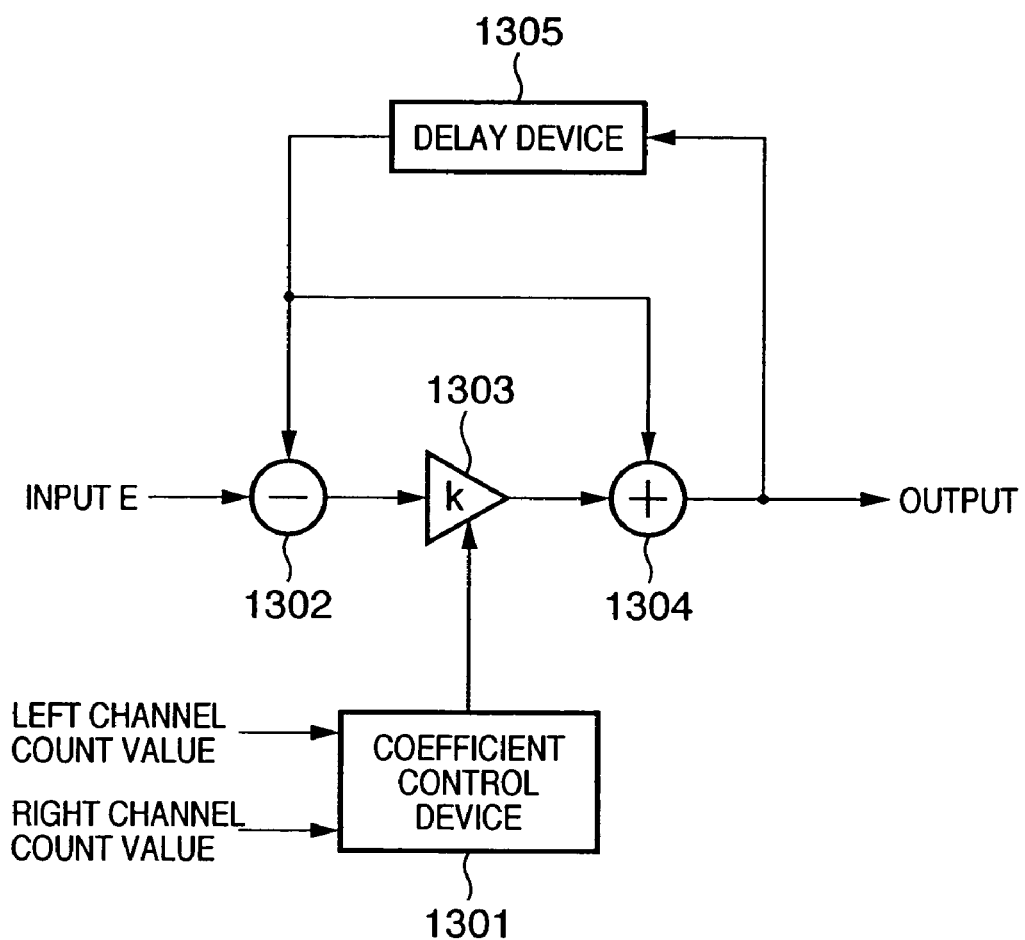
FIG. 13 is a block diagram showing an arrangement example of an integration device in the third embodiment.
Figure 14:
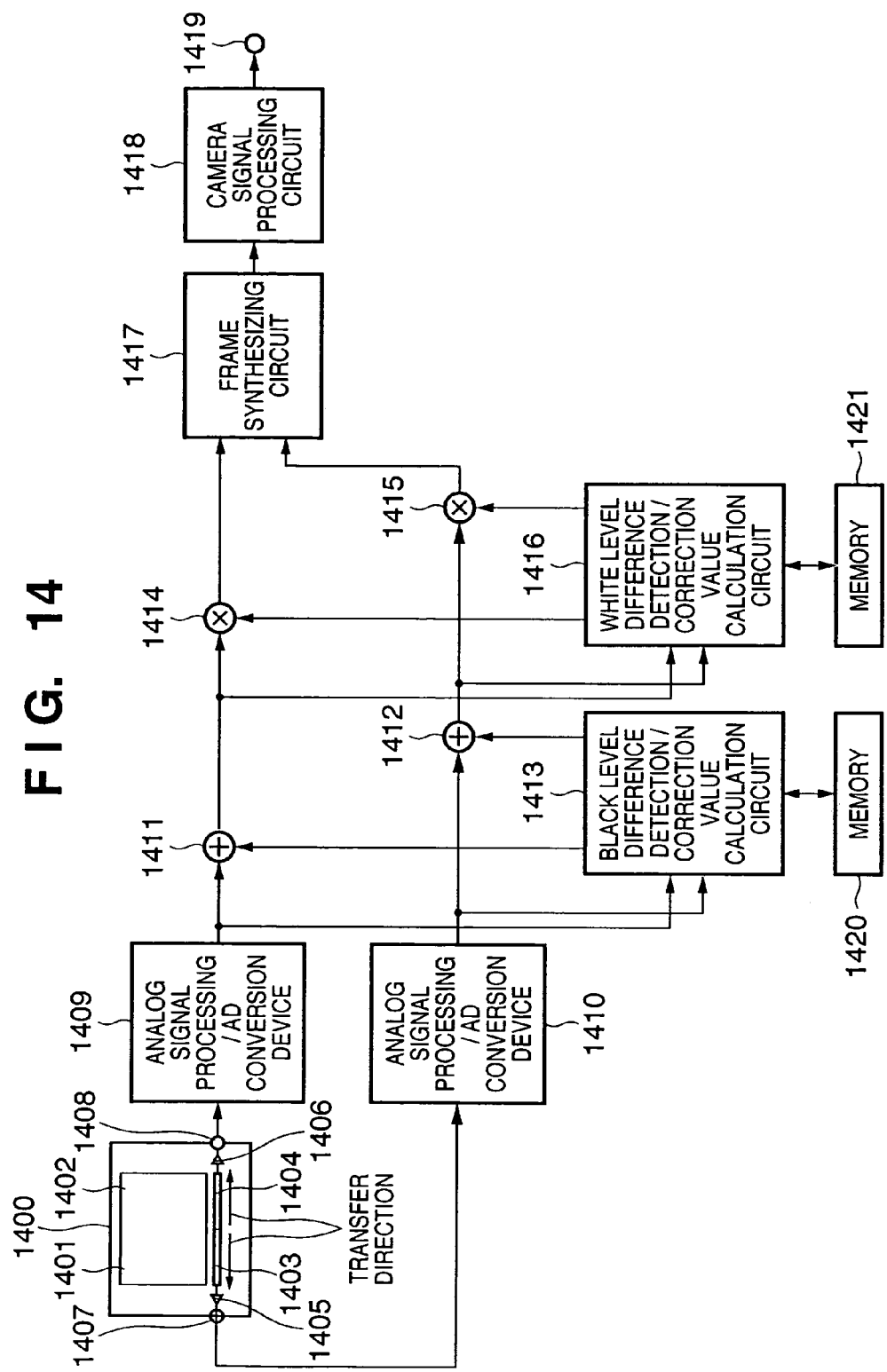
FIG. 14 is a block diagram showing an example of a conventional correction apparatus.

An output from the limiter device 1202 is input to an integration device 1203. The integration device 1203 also simultaneously receives the left channel count value and right channel count value obtained by the level difference evaluation value generation device 116. FIG. 13 shows the internal arrangement of the integration device 1203. The arrangement and operation except for a coefficient control device 1301 are the same as those in the first embodiment. More specifically, reference numeral 1302 in FIG. 13 corresponds to the subtraction device 701 in FIG. 7; 1303, to the coefficient unit 702 in FIG. 7; 1304, to the addition device 703 in FIG. 7; and 1305, to the delay device 704 in FIG. 7.

The coefficient control device 1301 outputs 0 when either the left channel count value or right channel count value is 0; otherwise, outputs a predetermined coefficient k.

By this coefficient control, the evaluation value is excluded from integration targets when no pixel having a level near the reference level within the rectangular region exists. As described above, only a pixel having a level near the reference level within the rectangular region is selected to generate an evaluation value. Correction of a remaining error upon dynamic variations can be performed at high precision.

An output from the integration device 1203 is multiplied by a coefficient by a correction amount control device 1204. The operations of the correction amount control device 1204, a gain correction characteristic table 1205, and a gain correction amount calculation device 1206 are the same as those in the first embodiment. Referring back to FIG. 1, an obtained left channel gain adjustment value C and right channel gain adjustment value D are respectively supplied to gain adjustment devices 114 and 113.

As described above, according to the first to third embodiments, the correction coefficient is determined by correcting an object-dependent level difference component. The operation appropriately copes with even dynamic variations such as temperature variations or variations over time, and the non uniformity between a plurality of image sensing regions can be corrected in real time. Since the non uniformity between a plurality of image sensing regions can be corrected in real time, a level difference appearing in an image can be reliably eliminated.

Fourth Embodiment

Figure 15:
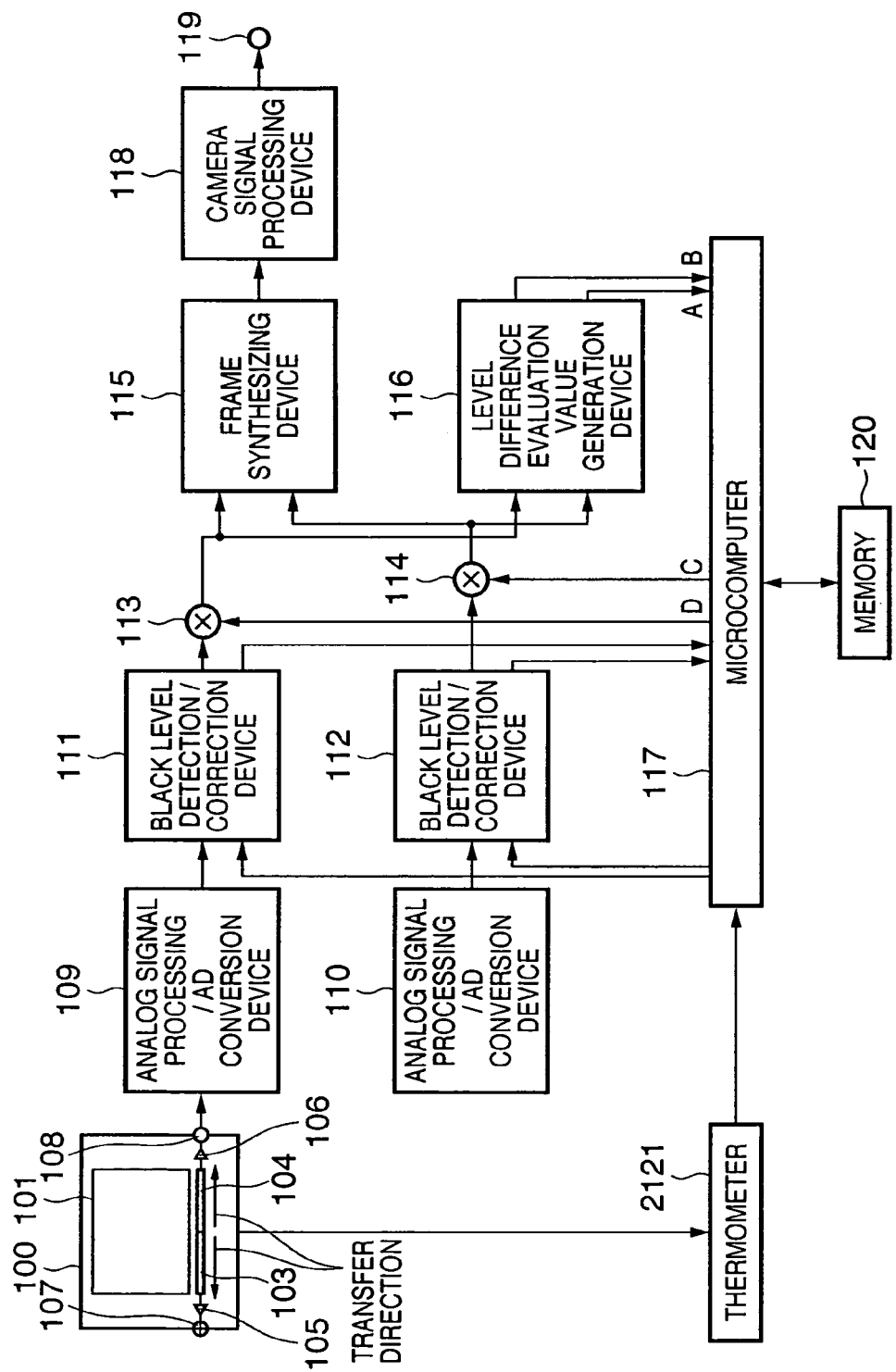
FIG. 15 is a block diagram showing the fifth embodiment of the present invention and showing an arrangement example of a video camera to which the present invention is applied.

FIG. 15 is a block diagram showing the arrangement of an image sensing apparatus to which a correction apparatus is applied according to the fourth embodiment of the present invention. The detailed arrangement of the overall image sensing apparatus is the same as that in the first embodiment except that the apparatus comprises a thermometer 2121 which measures the temperature of a CCD 100. Also, the whole operation is basically the same as the operation of the first embodiment described with reference to FIGS. 1 to 4 except for processes executed by a microcomputer 117.

The fourth embodiment takes the temperature of the CCD 100 into consideration.

In the fourth embodiment and the following embodiments, gain adjustment devices 113 and 114, a level difference evaluation value generation device 116, and the microcomputer 117 form a correction apparatus for detecting and correcting the non uniformity between two systems.

Figure 16:
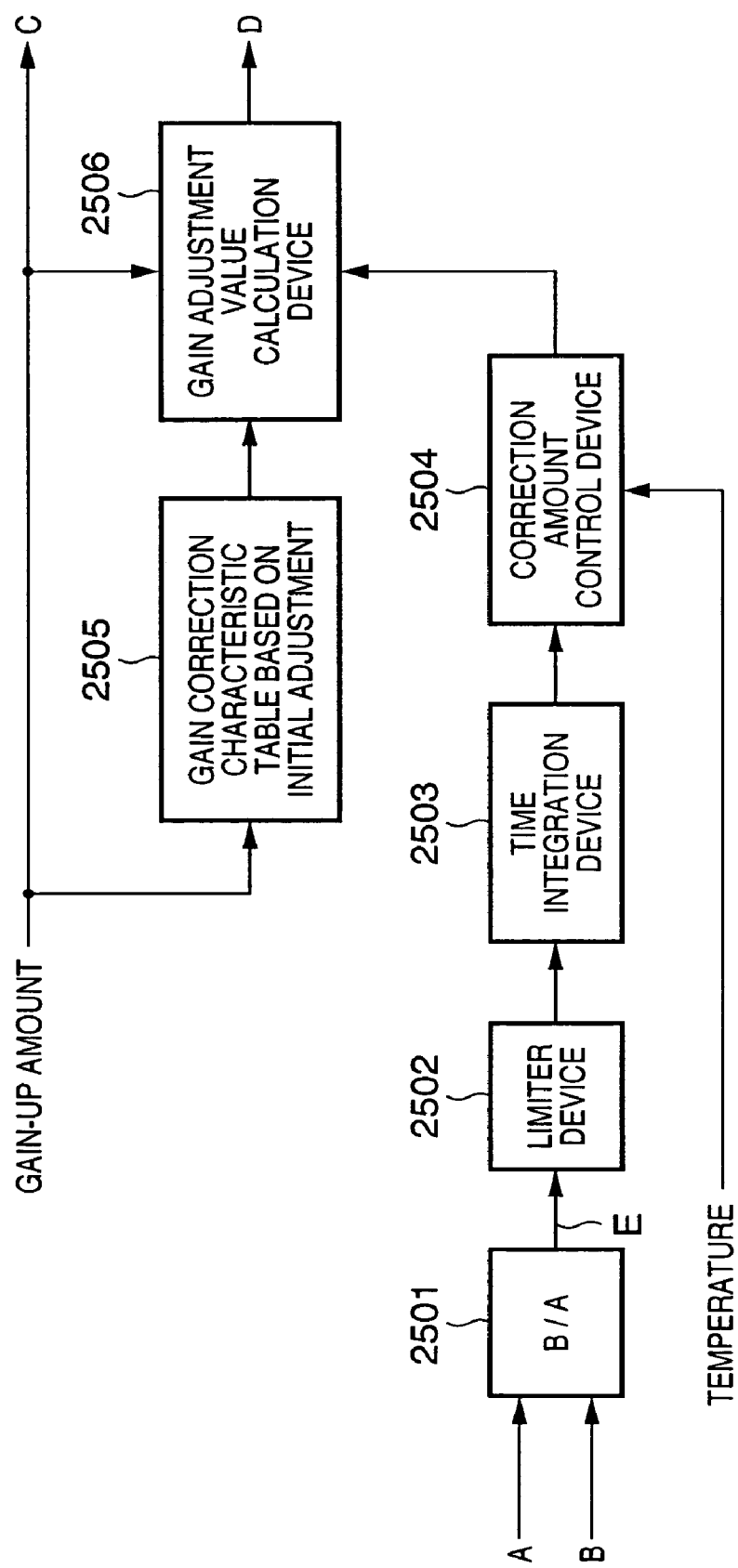
FIG. 16 is a block diagram showing an arrangement example of a device which executes a gain adjustment value calculation sequence in the fourth embodiment.

FIG. 16 shows the arrangement of a block for correction of a remaining gain error executed by the microcomputer 117 serving as a correction coefficient determination device which determines a correction coefficient for reducing the level difference between a plurality of image sensing signals from a plurality of output terminals of the CCD area sensor on the basis of temperature information measured by the thermometer 2121. Signals A, B, C, and D in FIG. 16 correspond to signals A, B, C, and D in FIGS. 15 and 1. Reference symbol A denotes a left channel level difference evaluation value; B, a right channel level difference evaluation value; C, a left channel gain adjustment value; and D, a right channel gain adjustment value.

The left channel level difference evaluation value A and right channel level difference evaluation value B input to the microcomputer 117 are input to a gain error calculation device 2501 to calculate a gain error amount E. The gain error amount E is given by $$E=B/A \qquad (6)$$

The gain error amount E calculated by the gain error calculation device 2501 is merely the ratio of pixel levels, and is influenced by the non uniformity between channels and also an object-dependent level difference. To perform accurate gain error correction, an object-dependent level difference component must be excluded. In the fourth embodiment, the object-dependent level difference component is excluded by a limiter device 2502 and integration device 2503.

FIG. 6 shows an example of the input/output characteristic of the limiter device 2502. The origin in FIG. 6 represents a point at which the limiter input=the limiter output=1.0. Because of the level ratio of channels, the value is 1.0 in the absence of any gain error.

When the level difference ratio exceeds the threshold TH, the limiter output becomes 1.0, as shown in FIG. 6. The threshold TH is determined in correspondence with the remaining gain error amount. In this process, a large level difference is regarded as an object-dependent level difference and excluded.

FIG. 7 shows the internal arrangement of the integration device 2503. The difference between an input signal X(0) and a signal Y(−1) delayed by a predetermined time is calculated by a subtraction device 701, and the difference is multiplied by a coefficient k by a coefficient unit 702. An output from the coefficient unit 702 is added to a delay signal by an addition device 703 to output the sum and also supply it to a delay device 704. An output signal Y(0) is given by $$Y(0)=kX(0)+(1-k)Y(-1)(0<k<1) \qquad (7)$$

The delay time is equal to the CCD vertical scanning period. This process provides the average value of the error amounts of past 1/k frames. In general, the object is not fixed within the angle of view for a long time, and thus the average of a plurality of frames is calculated to cancel and exclude an object-dependent level difference component.

By the above process, an object-dependent level difference is excluded, and a gain error generated by the non uniformity between channels is extracted. The gain error amount is multiplied by a coefficient by a correction amount control device 2504. This coefficient corresponds to the feedback gain of the gain error correction loop. For a large gain, the correction ability is high, but the operation is unstable against disturbance such as erroneous detection. For a small gain, the operation is stable against disturbance, but the correction ability is low.

Figure 17:
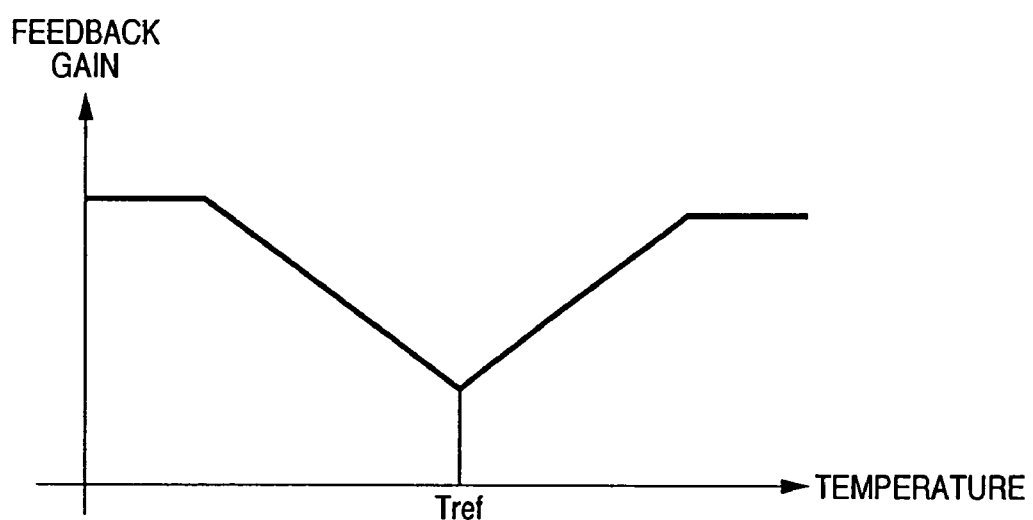
FIG. 17 is a graph showing the correction amount control characteristic in the fourth embodiment.

FIG. 17 shows the control characteristic of the feedback gain to the temperature of the CCD 100. The temperature of the CCD 100 is measured by the thermometer 2121 shown in FIG. 15, and input to the microcomputer 117. Tref in FIG.

17 is a reference temperature, and corresponds to a temperature in measuring a gain correction characteristic. The correction amount control device controls to increase the feedback gain as the temperature deviates from the reference temperature, as shown in FIG. 17.

The main factor of dynamic variations by the non uniformity between channels is temperature variations. The above control can effectively correct temperature variations.

An output from the correction amount control device 2504 is supplied to a gain correction amount calculation device 2506. The gain correction amount calculation device 2506 also receives an output from a gain correction characteristic table 2505. The gain correction characteristic table 2505 is a table of gain correction characteristics described above.

As illustrated in FIG. 4, a gain correction amount is obtained in correspondence with the gain-up amount. The gain correction amount calculation device 2506 multiplies these two input signals and the gain-up amount to actually calculate a gain adjustment value for the right channel. The calculated gain adjustment value is supplied to the gain adjustment device 113 shown in FIG. 15. The gain adjustment device 114 receives the gain-up amount.

Signals after gain adjustment are supplied to a frame synthesizing device 115 and the level difference evaluation value generation device 116. The frame synthesizing device 115 synthesizes two signals and outputs the synthesized signal as an image of one frame to a camera signal processing circuit 118. The camera signal processing circuit 118 executes signal processes such as γ correction, color correction, and edge correction, and outputs the resultant signal as an image signal from a terminal 119.

Fifth Embodiment

Figure 18:
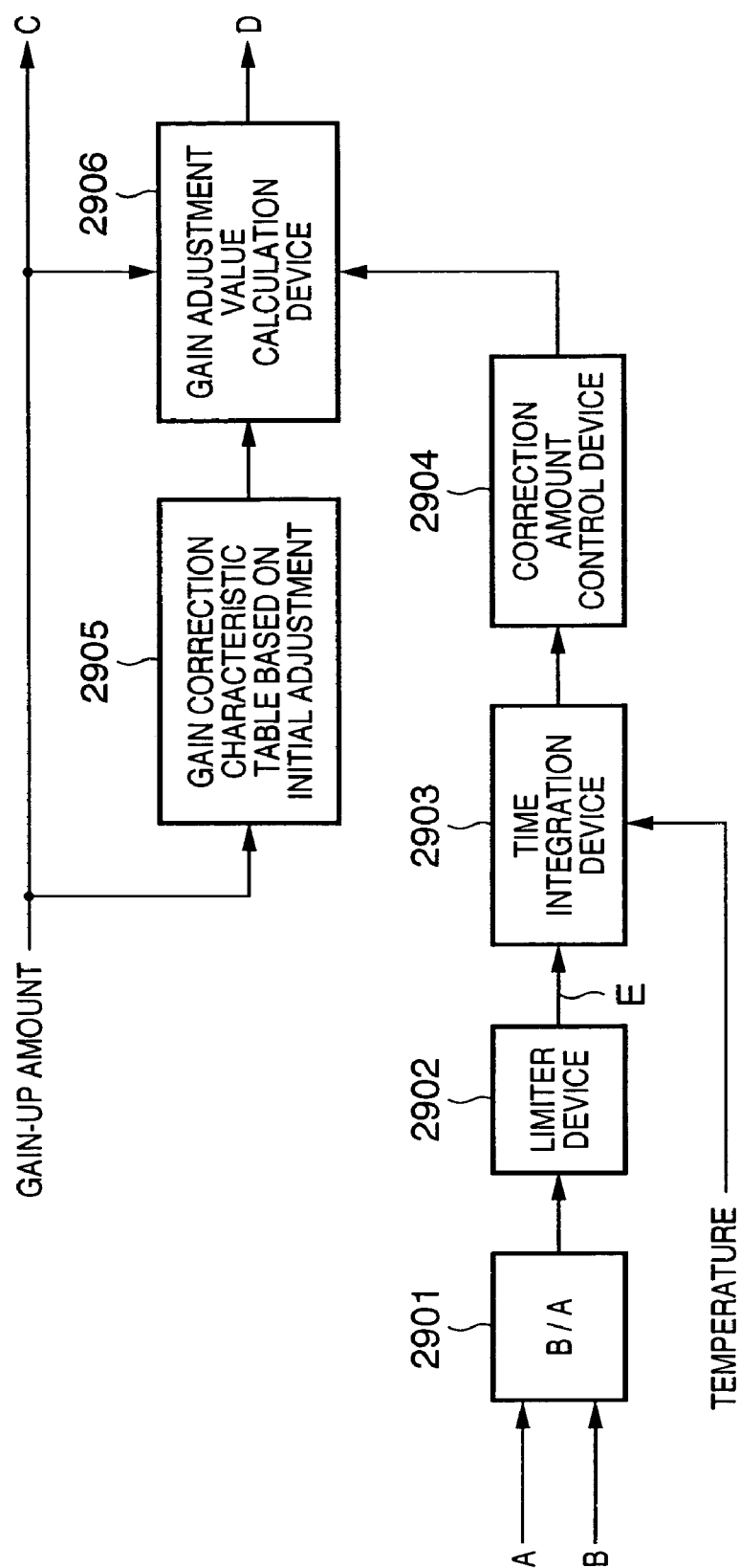
FIG. 18 is a block diagram showing an arrangement example of a device which executes a gain adjustment value calculation sequence in the fifth embodiment.

FIG. 18 is a signal processing block diagram for explaining the fifth embodiment of the present invention. The detailed arrangement of an overall image sensing apparatus is the same as that in the fourth embodiment. Signal processes in the arrangement shown in FIG. 18 are executed within a microcomputer 117 in FIG. 15. A rectangular region for evaluation value measurement is the same as that in the fourth embodiment.

A left channel level difference evaluation value A and right channel level difference evaluation value B input to the microcomputer 117 are input to a gain error calculation device 2901 to calculate a gain error amount. The arrangements and operations of the gain error calculation device 2901 and a limiter device 2902 are the same as those in the fourth embodiment, and a description thereof will be omitted.

Figure 19:
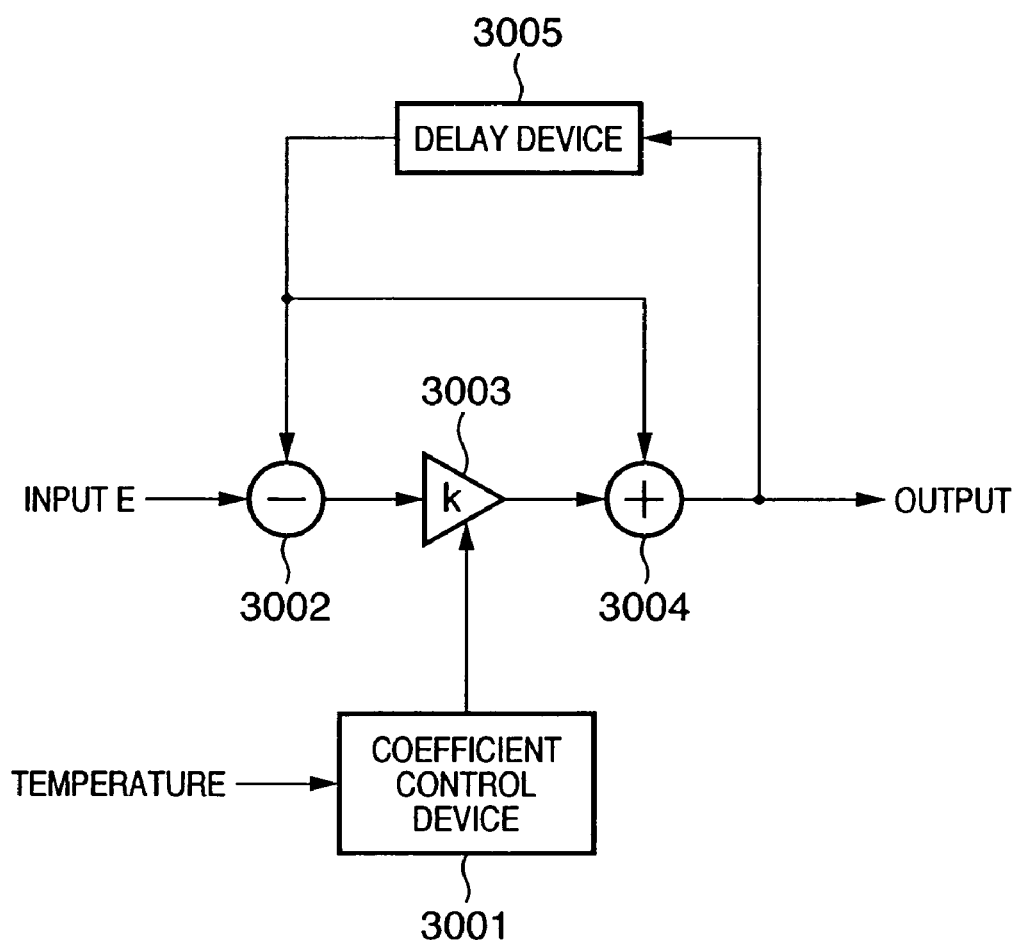
FIG. 19 is a block diagram showing an arrangement example of an integration device in the fifth embodiment.

An output from the limiter device 2902 is input to an integration device 2903. The integration device 2903 also simultaneously receives a temperature around the CCD that is measured by a thermometer 2121. FIG. 19 shows the internal arrangement of the integration device 2903. The operation except for a coefficient control device 3001 is the same as that in the fourth embodiment.

Figure 20:
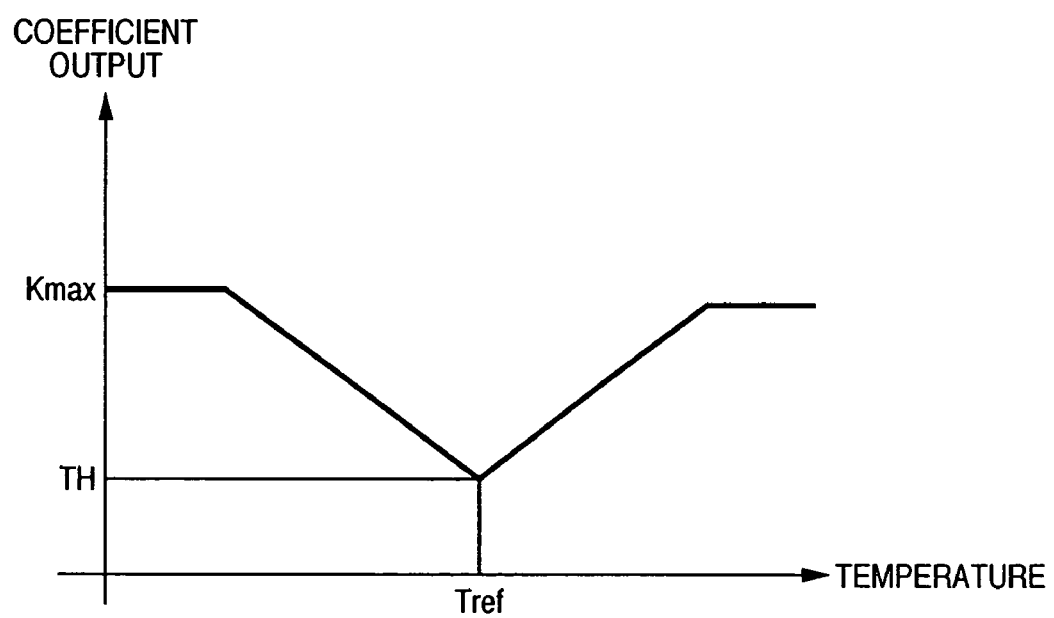
FIG. 20 is a graph showing the coefficient control characteristic in the fifth embodiment.

FIG. 20 shows the coefficient control characteristic of the coefficient control device 3001. In FIG. 20, the abscissa represents the temperature around the CCD that is measured by the thermometer 2121, and the ordinate represents a coefficient supplied to a coefficient unit 3003. Tref in the graph is a reference temperature described in the fourth embodiment.

When the temperature around the CCD is a reference temperature, the output coefficient takes a predetermined value k, as shown in FIG. 20. If the temperature deviates from the reference temperature, a value larger than k is output. This coefficient control allows controlling the response of the correction loop in accordance with the temperature, and correction upon temperature variations can be done at high precision.

An output from the integration device 2903 is multiplied by a coefficient by a correction amount control device 2904. The correction amount control device 2904 does not perform any control based on the temperature, unlike the fourth embodiment. The operations of a gain correction characteristic table 2905 and gain correction amount calculation device 2906 are the same as those in the fourth embodiment.

Referring back to FIG. 15, an obtained left channel gain adjustment value C and right channel gain adjustment value D are respectively supplied to gain adjustment devices 114 and 113.

Sixth Embodiment

Figure 21:
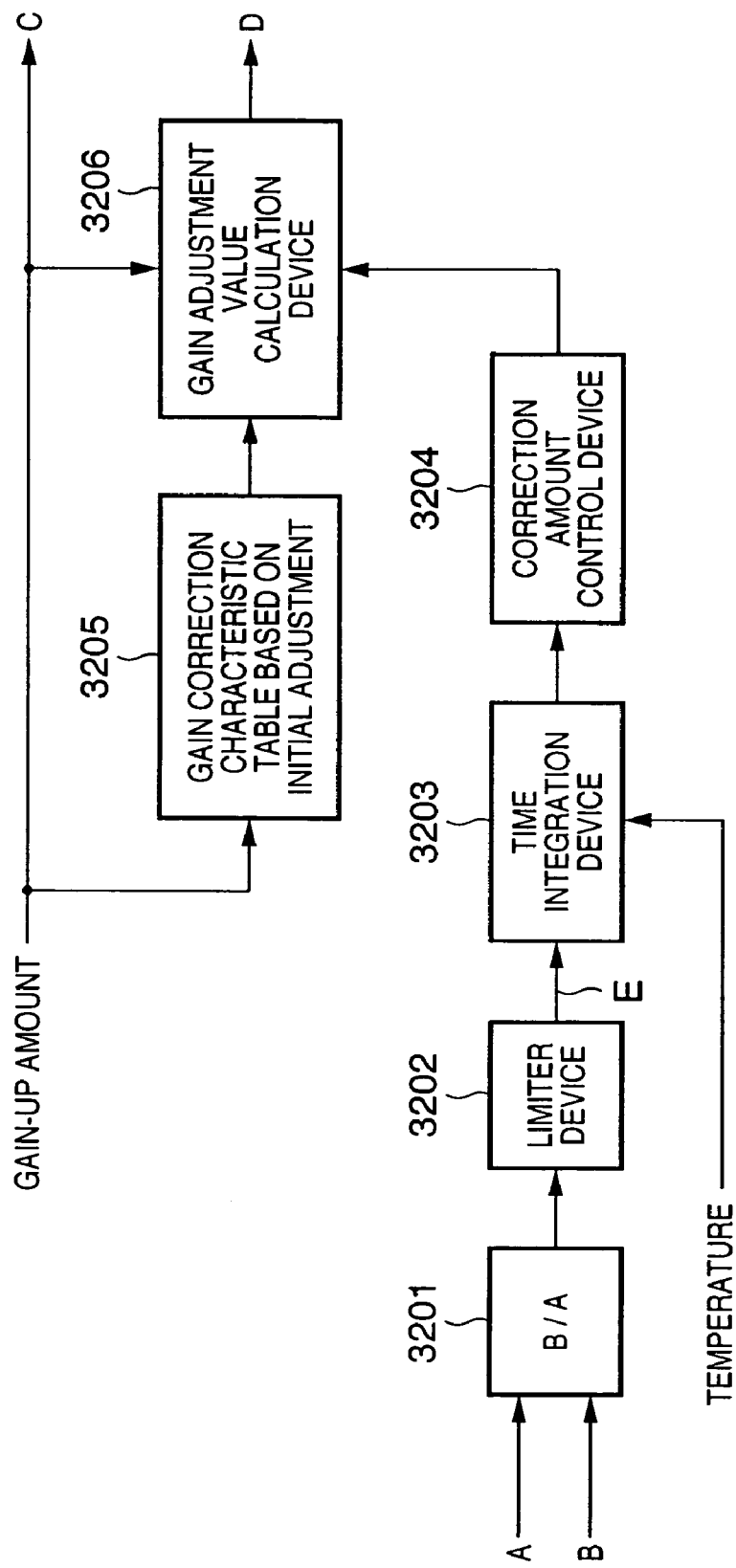
FIG. 21 is a block diagram showing an arrangement example of a device which executes a gain adjustment value calculation sequence in the sixth embodiment.

FIG. 21 is a signal processing block diagram for explaining the sixth embodiment of the present invention. The detailed arrangement of an overall image sensing apparatus is the same as that in the fourth embodiment. Signal processes shown in FIG. 21 are executed within a microcomputer 117 in FIG. 15. A rectangular region for evaluation value measurement is the same as that in the fourth embodiment.

A left channel level difference evaluation value A and right channel level difference evaluation value B input to the microcomputer 117 are input to a gain error calculation device 3201 to calculate a gain error amount. The arrangement and operation of the gain error calculation device 3201 are the same as those in the fourth embodiment, and a description thereof will be omitted.

An output from the gain error calculation device 3201 is input to a limiter device 3202. The limiter device 3202 simultaneously receives a temperature around the CCD that is measured by a thermometer 2121.

Figure 22:
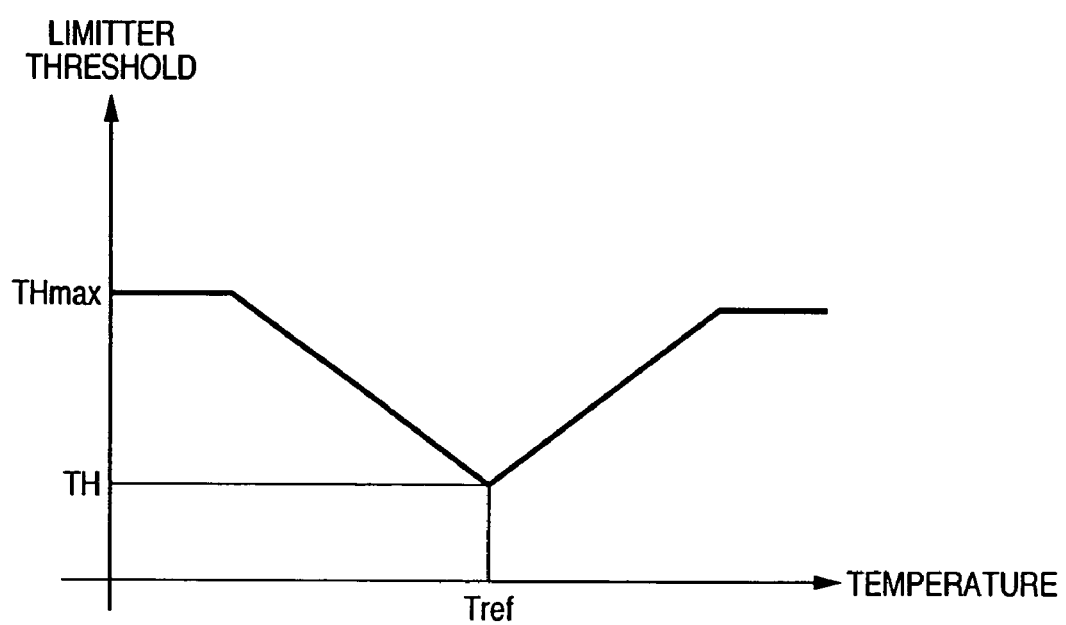
FIG. 22 is a graph showing the limitter threshold control characteristic in the sixth embodiment.

FIG. 22 shows the threshold control characteristic of the limiter device 3202. In FIG. 22, the abscissa represents the temperature around the CCD that is measured by the thermometer 2121, and the ordinate represents the threshold of the limiter. Limiter operation to the threshold is shown in FIG. 6. Tref in the graph is a reference temperature described in the fourth embodiment.

When the temperature around the CCD is a reference temperature, the output threshold takes a predetermined value TH, as shown in FIG. 22. If the temperature deviates from the reference temperature, a value larger than the predetermined value TH is output. This threshold control realizes level difference detection level control corresponding to the temperature, and correction upon temperature variations can be performed at high precision.

An output from the limitter device 3202 is input to an integration device 3203. The operation of the integration device is the same as that in the fourth embodiment. An output from the integration device 3203 is multiplied by a coefficient by a correction amount control device 3204. The correction amount control device 3204 does not perform any control based on the temperature, unlike the fourth embodiment.

The operations of a gain correction characteristic table 3205 and gain correction amount calculation device 3206 are the same as those in the fourth embodiment.

Referring back to FIG. 15, an obtained left channel gain adjustment value C and right channel gain adjustment value D are respectively supplied to gain adjustment devices 114 and 113.

As described above, according to the fourth to sixth embodiments, the correction degree is controlled in accordance with temperature information. When dynamic variations such as temperature variations occur, they can be corrected in real time, reliably eliminating a level difference appearing in an image.

Seventh Embodiment

Figure 23:
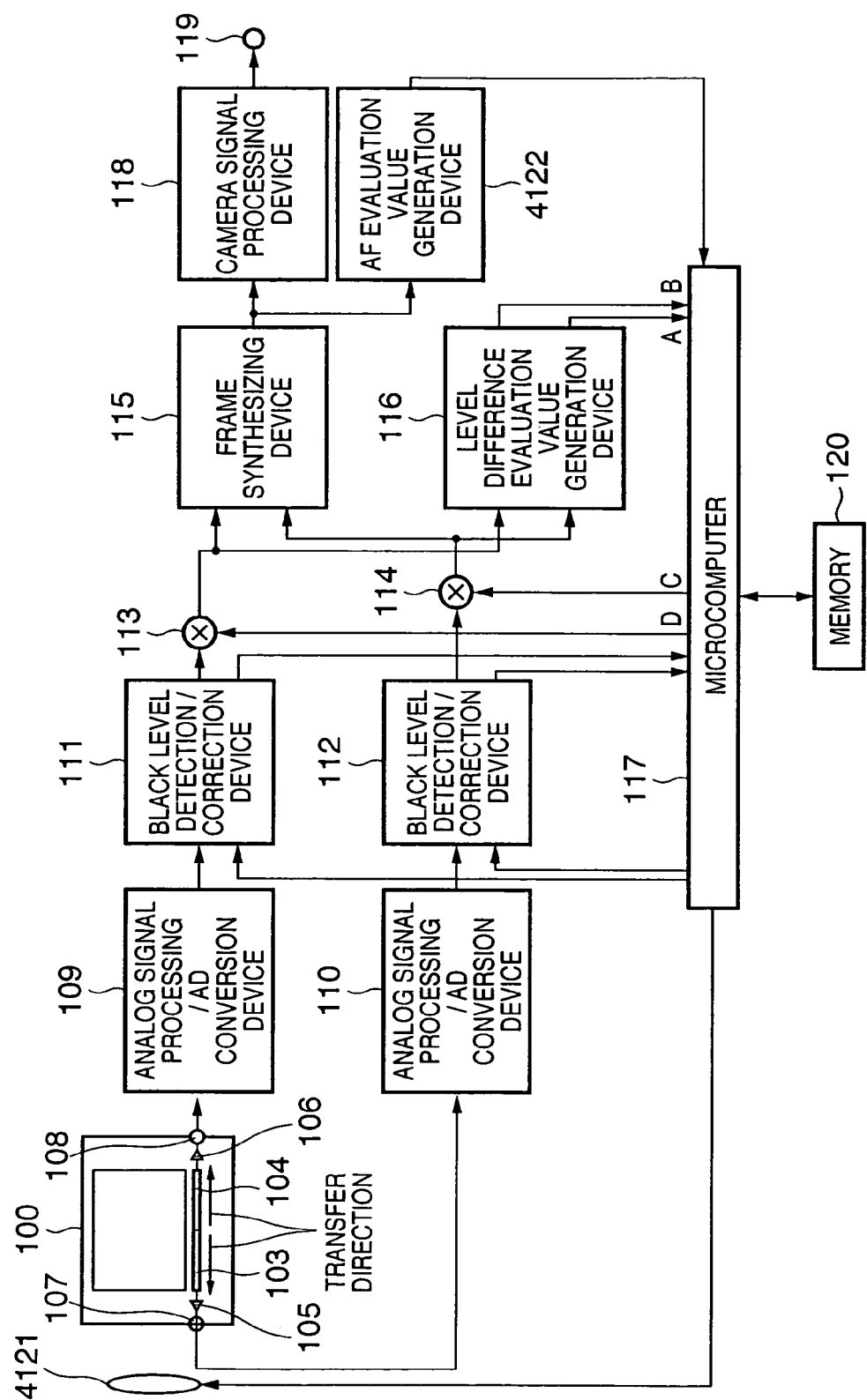
FIG. 23 is a block diagram showing the seventh embodiment of the present invention and showing the arrangement of the seventh embodiment in which a correction apparatus according to the present invention is applied to a video camera.

FIG. 23 is a block diagram showing the arrangement of an image sensing apparatus to which a correction apparatus is applied according to the seventh embodiment of the present invention. The detailed arrangement of the overall image sensing apparatus is the same as that in the first embodiment except that an imaging optical system 4121 is specified and an AF evaluation value generation device 4122 is arranged. The whole operation is basically the same as the operation of the first embodiment described with reference to FIGS. 1 to 4 except for processes executed by a microcomputer 117 and processes executed by the AF evaluation value generation device 4122.

The fifth embodiment considers the focusing degree of the imaging optical system 4121.

The optical system 4121 forms an object image on a CCD 100, and the microcomputer 117 controls the focus and stop.

An object image formed on the CCD 100 by the imaging optical system 4121 is converted into an electrical signal by a photoelectric conversion unit 101. The signal is divided into two signals by horizontal transfer paths 103 and 104, and the two signals are supplied to output amplifiers 105 and 106.

In the seventh embodiment and the following embodiments, gain adjustment devices 113 and 114, a level difference evaluation value generation device 116, and the microcomputer 117 form a correction apparatus for detecting and correcting the non uniformity between two systems.

Figure 24:
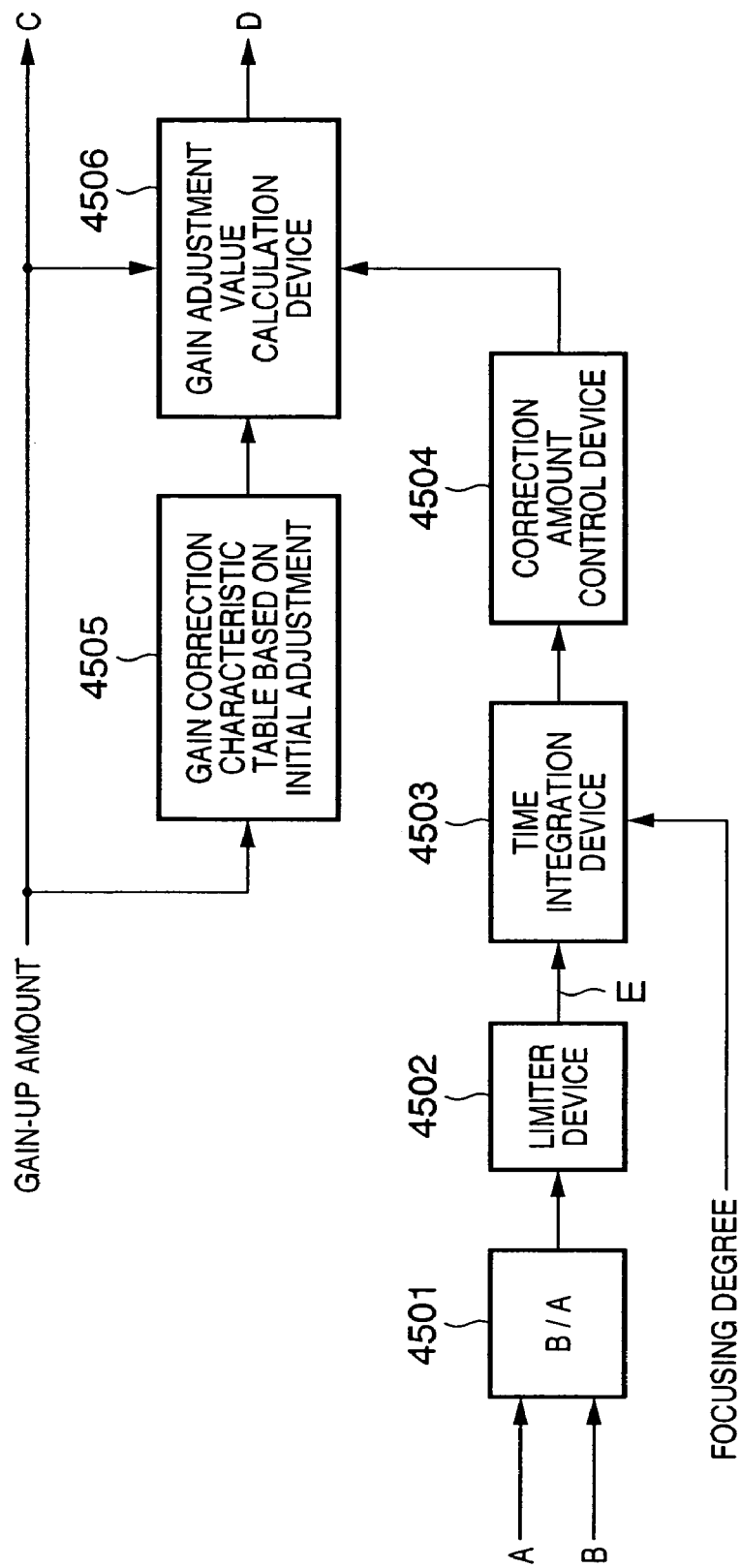
FIG. 24 is a block diagram showing an arrangement example of a device which executes a gain adjustment value calculation sequence in the seventh embodiment.

FIG. 24 shows the arrangement of a block for correction of a remaining gain error executed by the microcomputer 117 serving as a correction coefficient determination device which determines a correction coefficient on the basis of the focusing degree of the imaging optical system for forming an object image on an image sensing element, and supplies the determined correction coefficient to the gain adjustment device to perform adjustment so as to reduce the level difference between image sensing signals output from different output terminals of the CCD area sensor. Signals A, B, C, and D in FIG. 24 correspond to signals A, B, C, and D in FIGS. 23 and 1. Reference symbol A denotes a left channel level difference evaluation value; B, a right channel level difference evaluation value; C, a left channel gain adjustment value; and D, a right channel gain adjustment value.

The left channel level difference evaluation value A and right channel level difference evaluation value B input to the microcomputer 117 are input to a gain error calculation device 4501 to calculate a gain error amount E. The gain error amount E is given by $$E = B/A \quad (6)$$

The gain error amount E calculated by the gain error calculation device 4501 is merely the ratio of pixel levels, and is influenced by the non uniformity between channels and also an object-dependent level difference. To perform accurate gain error correction, an object-dependent level difference component must be excluded. In the seventh embodiment, the object-dependent level difference component is excluded by a limiter device 4502 and integration device 4503.

FIG. 6 shows the input/output characteristic of the limiter device 4502. The origin in FIG. 6 represents a point at which the limiter input=the limiter output=1.0. Because of the level ratio of channels, the value is 1.0 in the absence of any gain error.

When the level difference ratio exceeds the threshold TH, the limiter output becomes 1.0, as shown in FIG. 6. The threshold TH is determined in correspondence with the remaining gain error amount. In this process, a large level difference is regarded as an object-dependent level difference and excluded.

Figure 25:
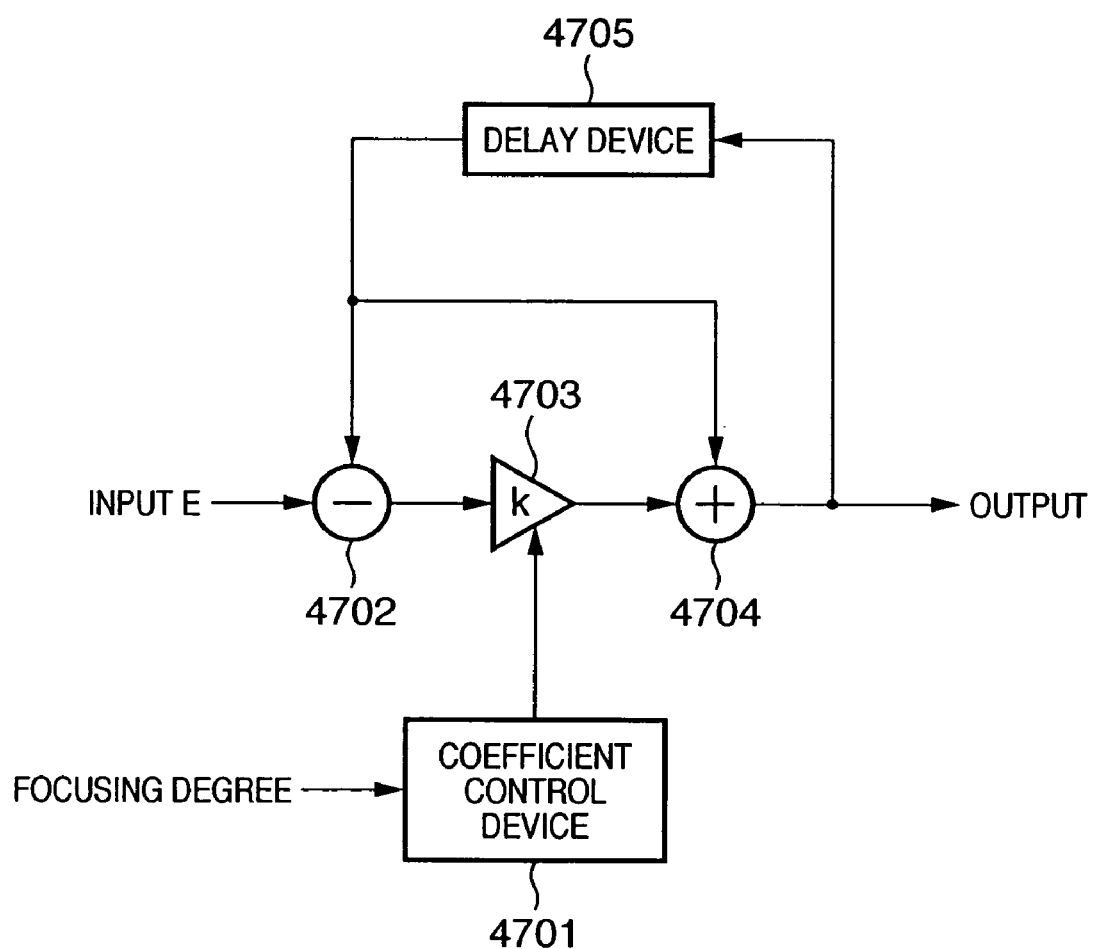
FIG. 25 is a block diagram showing an arrangement example of an integration device in the seventh embodiment.

FIG. 25 shows the internal arrangement of the integration device 4503. The difference between an input signal X(0) and a signal Y(−1) delayed by a predetermined time is calculated by a subtraction device 4702, and the difference is multiplied by a coefficient k by a coefficient unit 4703. An output from the coefficient unit 4703 is added to a delay signal by an addition device 4704 to output the sum and also supply it to a delay device 4705. An output signal Y(0) is given by $$Y(0) = kX(0) + (1-k)Y(-1)(0 < k < 1) \quad (7)$$

The delay time is equal to the CCD vertical scanning period. This process provides the average value of the error amounts of past 1/k frames. In general, the object is not fixed within the angle of view for a long time, and thus the average of a plurality of frames is calculated to cancel and exclude an object-dependent level difference component.

Focusing degree information is input to a coefficient control device 4701 to control the coefficient k supplied to the coefficient unit 4703. Coefficient control will be described later.

By the above process, an object-dependent level difference is excluded, and a gain error generated by the non uniformity between channels is extracted. The gain error amount is multiplied by a coefficient by a correction amount control device 4504. This coefficient corresponds to the feedback gain of the gain error correction loop. For a large gain, the correction ability is high, but the operation is unstable against disturbance such as erroneous detection. For a small gain, the operation is stable against disturbance, but the correction ability is low.

An output from the correction amount control device 4504 is supplied to a gain correction amount calculation device 4506.

The gain correction amount calculation device 4506 also receives an output from a gain correction characteristic table 4505. The gain correction characteristic table 4505 is a table of gain correction characteristics described above. As illustrated in FIG. 4, a gain correction amount is obtained in correspondence with the gain-up amount.

The gain correction amount calculation device 4506 multiplies these two input signals and the gain-up amount to actually calculate a gain adjustment value for the right channel. The calculated gain adjustment value is supplied to the gain adjustment device 113 shown in FIG. 23. The gain adjustment device 114 receives the gain-up amount.

Signals after gain adjustment are supplied to a frame synthesizing device 115 and the level difference evaluation value generation device 116. The frame synthesizing device 115 synthesizes two signals and outputs the synthesized signal as an image of one frame to a camera signal processing circuit 118 and the AF evaluation value generation device 4122. The camera signal processing circuit 118 executes signal processes such as γ correction, color correction, and edge correction, and outputs the resultant signal as an image signal from a terminal 119.

The AF evaluation value generation device 4122 generates an evaluation value necessary to determine the focusing degree by a method of, e.g., extracting the edge component of a frame, and outputs the evaluation value to the microcomputer 117. The microcomputer 117 determines the focusing degree by using the evaluation value, and controls the imaging optical system 4121 on the basis of the result, realizing autofocus operation. The AF evaluation value generation method and focusing degree determination method are not essential to the present invention, and a detailed description thereof will be omitted.

As described above, disturbance factors include the level change of an object itself in measuring the level difference between right and left frames from a generally photographed image. The level change of the object changes depending on the focusing degree and maximizes in an in-focus state. By utilizing this property, the seventh embodiment variably controls the correction loop characteristic in accordance with the focusing degree.

Figure 28:
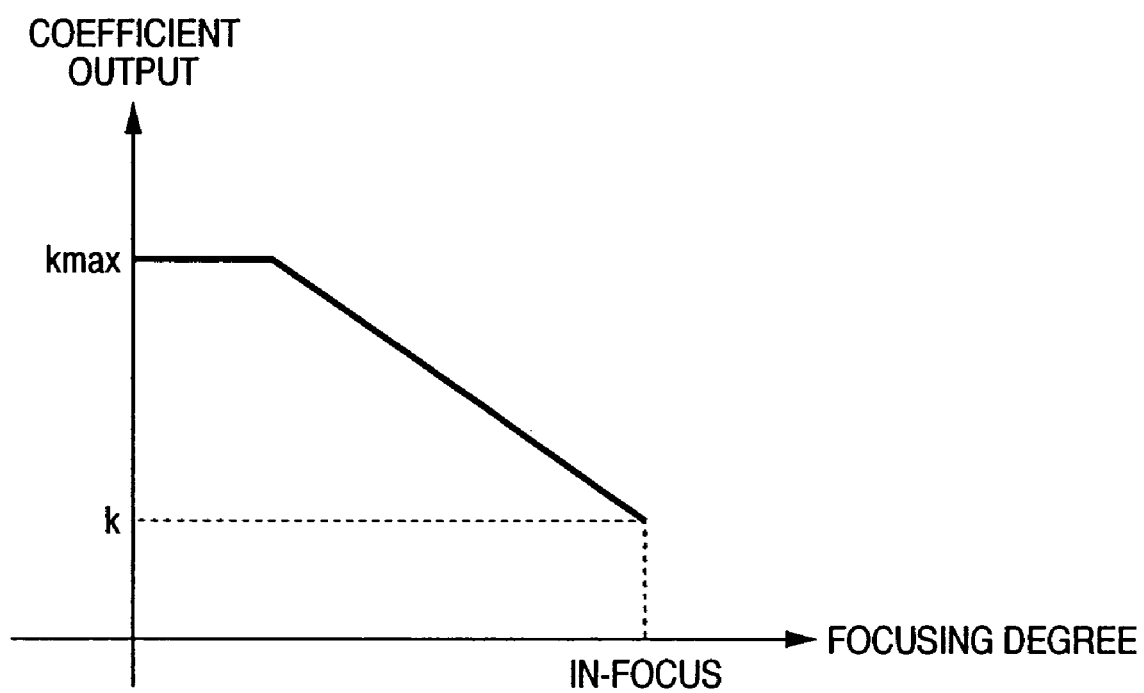
FIG. 28 is a graph showing the coefficient control characteristic in the eighth embodiment and showing the coefficient control characteristic to the focusing degree.

FIG. 28 shows the coefficient control characteristic to the focusing degree, and represents the operation of the coefficient control device in FIG. 25. In FIG. 28, the abscissa represents the focusing degree, and the focusing degree increases toward right. The ordinate represents an output coefficient. As the focusing degree decreases for the output coefficient in an in-focus state, the coefficient value increases.

Under this control, the number of frames to be averaged increases to stabilize the operation against disturbance (=object-dependent level difference) in an in-focus state in which the object-dependent level difference is most likely to maximize in an image sensing signal. To the contrary, in a defocused state, the object-dependent level difference decreases, and control which puts importance on the response characteristic rather than the loop stability is performed.

Eighth Embodiment

Figure 26:
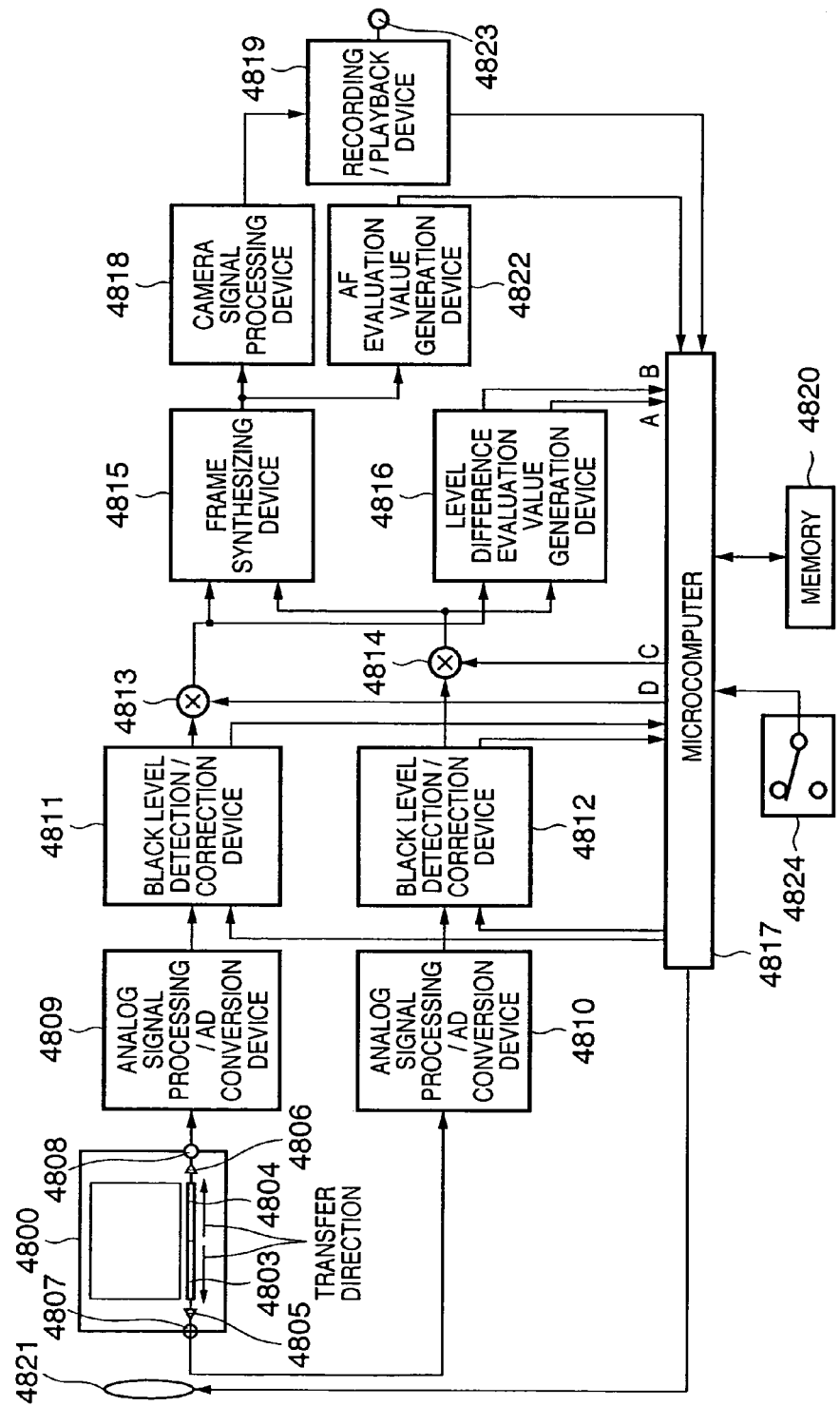
FIG. 26 is a block diagram showing the eighth embodiment in which a correction apparatus according to the present invention is applied to a video camera and showing an arrangement example of a recording/playback apparatus.
Figure 27:
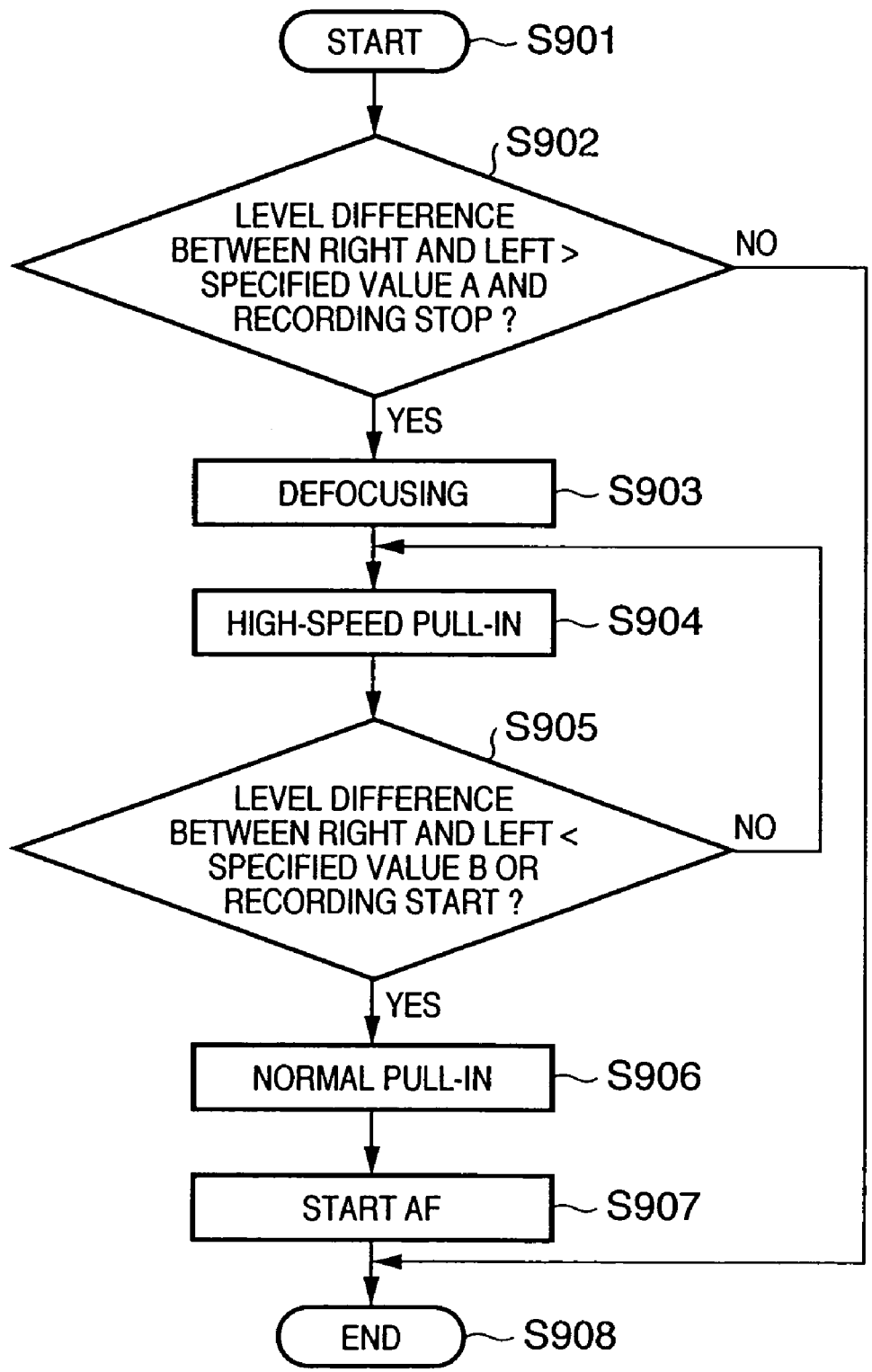
FIG. 27 is a flowchart for explaining the operation of the recording/playback apparatus in the eighth embodiment.

FIG. 26 is a block diagram schematically showing an image recording/playback apparatus according to the eighth embodiment of the present invention. FIG. 27 is a flowchart for explaining the operation of the recording/playback apparatus according to the eighth embodiment of the present invention. The operation shown in the flowchart of FIG. 27 is executed by a microcomputer 4817 in FIG. 26.

In FIG. 26, the signal processing flow from an image sensing element 4800 up to a camera signal processing device 4818 is the same as that in the seventh embodiment, and a description thereof will be omitted.

An image signal processed by the camera signal processing circuit 4818 is supplied to a recording/playback device 4819. The recording/playback device 4819 executes recording on a recording medium (not shown) and playback from the recording medium. An image signal output from the recording/playback device 4819 is externally output from an output terminal 4823.

A recording operation control switch 4824 is connected to the microcomputer 4817. The user of the image recording/playback apparatus presses the switch 4824 to control the start/stop of recording operation.

The operation of the recording/playback apparatus according to the eighth embodiment will be explained with reference to the flowchart of FIG. 27.

As shown in FIG. 27, when the process starts in step S901, the level difference between right and left channels is calculated, and whether the level difference is larger than a predetermined specified value A and the recording/playback device 4819 stops recording is determined in step S902.

If YES in step S902 as a result of determination, the process advances to step S903; if NO, a condition branch of ending the process is executed.

In step S903, the image sensing optical system is so controlled as to greatly move apart from an in-focus position. The process then advances to step S904 to control the gain correction control loop so as to operate in a high-speed pull-in mode.

The high-speed pull-in mode means an operation state in which the response characteristic of gain correction is improved by setting the feedback gain value multiplied by a correction amount control device 4504 in FIG. 24 to a value larger than a normal one, or decreasing the number of frames to be averaged by an integration device 4503.

In step S905, the level difference between right and left channels is evaluated. If the level difference becomes smaller than a reference value B or recording operation starts, the process advances to step S926; if NO, the high-speed pull-in mode continues. The reference value B is set smaller than the above-mentioned reference value A to give a hysteresis characteristic.

In step S906, the gain correction control loop is so controlled as to operate in a normal mode. In step S907, focus control returns to a normal autofocus mode, ending a series of operations. This operation is repetitively executed in a predetermined cycle.

Under this control, when a detected level difference between right and left channels increases and it becomes difficult to determine whether this level difference is an object-dependent one, the imaging optical system is defocused. This facilitates discrimination between the object-dependent level difference and the level difference caused by the non uniformity between right and left channels.

Since the response characteristic of the gain correction loop is so improved as to end the state within a short time, the defocused state does not continue for a long time.

By controlling not to perform this operation during recording operation, the user does not miss a photographing chance.

As described above, according to the seventh and eighth embodiments, the non uniformity between a plurality of image sensing regions can be corrected in real time. Further, adaptive control can be done in accordance with the focusing degree of the imaging optical system, and an object-dependent level difference component can be effectively removed. Even when dynamic variations occur, a level difference appearing in an image can be eliminated in appearance.

Ninth Embodiment

Figure 29:
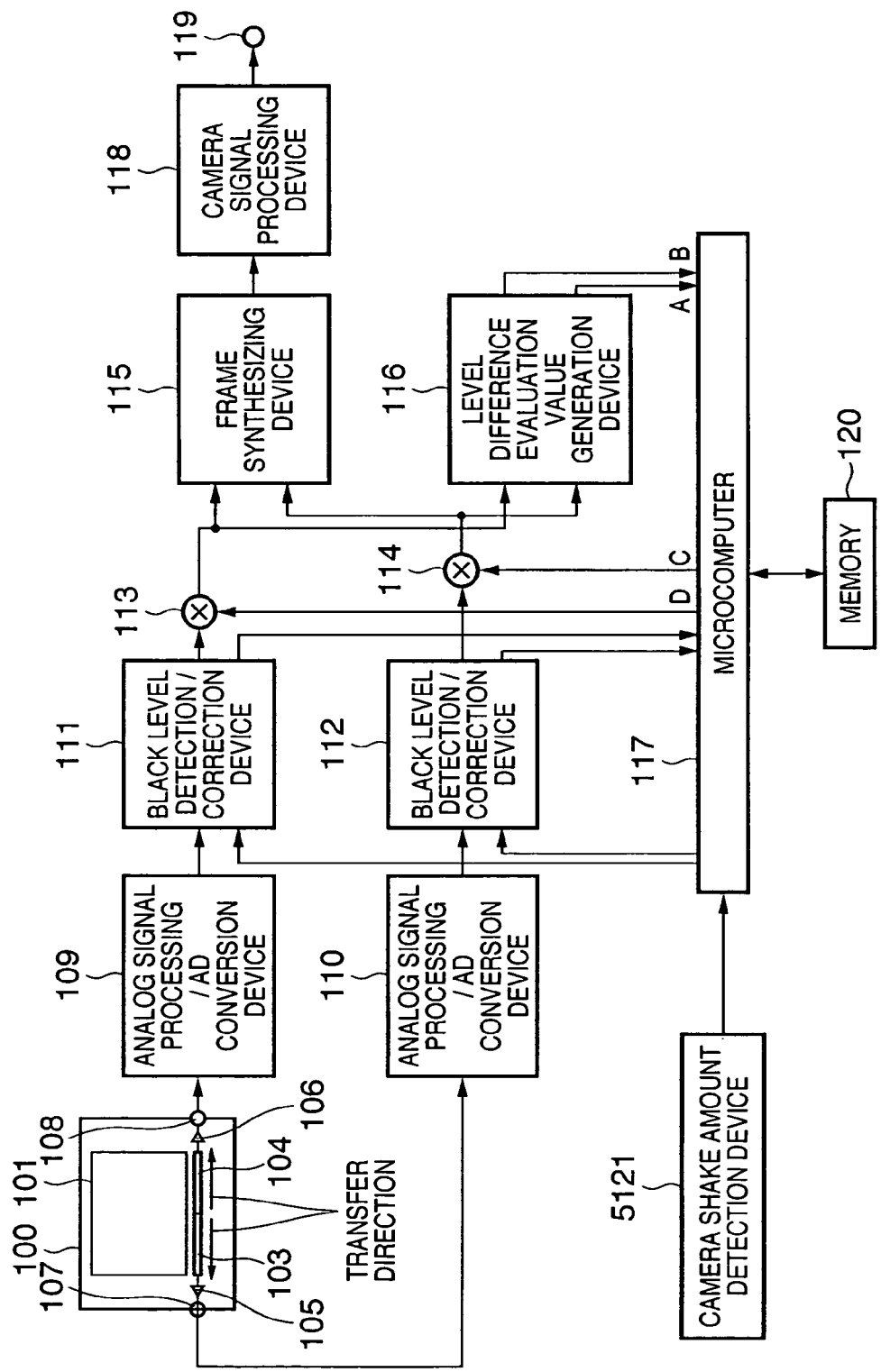
FIG. 29 is a block diagram showing the ninth embodiment of the present invention and showing the arrangement of the ninth embodiment in a video camera to which a correction apparatus according to the present invention is applied.

FIG. 29 is a block diagram showing the arrangement of an image sensing apparatus to which a correction apparatus is applied according to the ninth embodiment of the present invention. The detailed arrangement of the overall image sensing apparatus is the same as that in the first embodiment except that the apparatus comprises a camera shake amount detection device 5121 in an imaging optical system. Also, the whole operation is basically the same as the operation of the first embodiment described with reference to FIGS. 1 to 4 except for processes executed by a microcomputer 117.

The eighth embodiment takes the camera shake amount of the imaging optical system into consideration.

The imaging optical system forms an object image on a CCD 100, and the microcomputer 117 controls the focus and stop. An object image formed on the CCD 100 by the imaging optical system is converted into an electrical signal by a photoelectric conversion unit 101. The signal is divided into two signals by horizontal transfer paths 103 and 104, and the two signals are supplied to output amplifiers 105 and 106.

In the ninth embodiment, gain adjustment devices 113 and 114, a level difference evaluation value generation device 116, and the microcomputer 117 form a correction apparatus for detecting and correcting the non uniformity between two systems.

Figure 30:
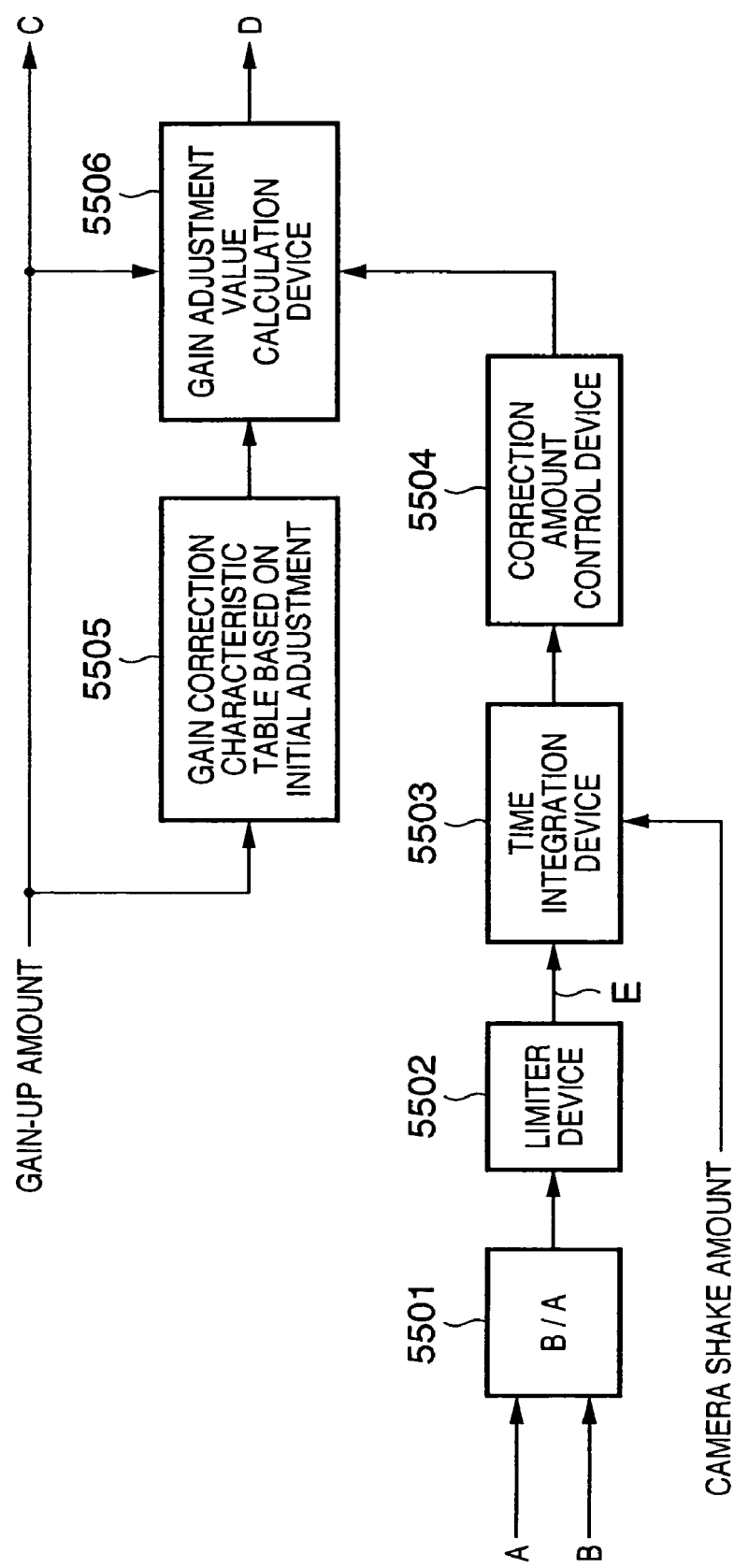
FIG. 30 is a block diagram showing an arrangement example of a device which executes a gain adjustment value calculation sequence in the ninth embodiment.

FIG. 30 shows the arrangement of a block for correction of a remaining gain error executed by the microcomputer 117 serving as a correction coefficient determination device which determines a correction coefficient on the basis of the detection result of the shake amount of a video camera, and supplies the determined correction coefficient to the gain adjustment device to perform adjustment so as to reduce the level difference between image sensing signals output from different output terminals of the CCD area sensor. Signals A, B, C, and D in FIG. 30 correspond to signals A, B, C, and D in FIGS. 29 and 1. Reference symbol A denotes a left channel level difference evaluation value; B, a right channel level difference evaluation value; C, a left channel gain adjustment value; and D, a right channel gain adjustment value.

The left channel level difference evaluation value A and right channel level difference evaluation value B input to the microcomputer 117 are input to a gain error calculation device 5501 to calculate a gain error amount E. The gain error amount E is given by $$E = B/A \quad (6)$$

The gain error amount E calculated by the gain error calculation device 5501 is merely the ratio of pixel levels, and is influenced by the non uniformity between channels and also an object-dependent level difference. To perform accurate gain error correction, an object-dependent level difference component must be excluded. In the ninth embodiment, the object-dependent level difference component is excluded by a limiter device 5502 and integration device 5503.

FIG. 6 shows the input/output characteristic of the limiter device 5502. The origin in FIG. 6 represents a point at which the limiter input=the limiter output=1.0. Because of the level ratio of channels, the value is 1.0 in the absence of any gain error.

When the level difference ratio exceeds the threshold TH, the limiter output becomes 1.0, as shown in FIG. 6. The threshold TH is determined in correspondence with the remaining gain error amount. In this process, a large level difference is regarded as an object-dependent level difference and excluded.

Figure 31:
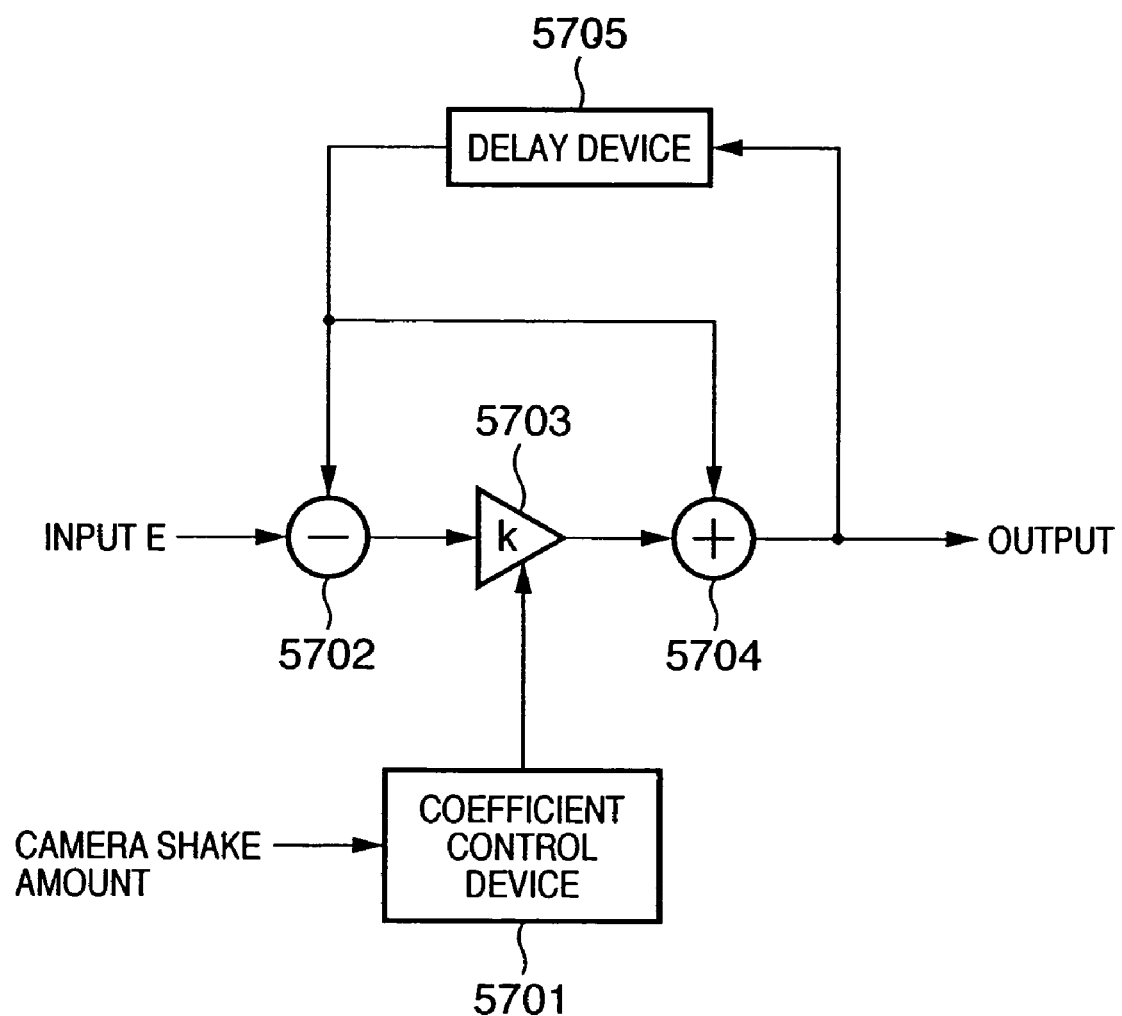
FIG. 31 is a block diagram showing an arrangement example of an integration device in the ninth embodiment.

FIG. 31 shows the internal arrangement of the integration device 5503. The difference between an input signal X(0) and a signal Y(-1) delayed by a predetermined time is calculated by a subtraction device 5702, and the difference is multiplied by a coefficient k by a coefficient unit 5703. An output from the coefficient unit 5703 is added to a delay signal by an addition device 5704 to output the sum and also supply it to a delay device 5705. An output signal Y(0) is given by $$Y(0) = kX(0) + (1-k)Y(-1) \quad (0 < k < 1) \quad (7)$$

The delay time is equal to the CCD vertical scanning period. This process provides the average value of the error amounts of past 1/k frames. In general, the object is not fixed within the angle of view for a long time, and thus the average of a plurality of frames is calculated to cancel and exclude an object-dependent level difference component.

Camera shake amount information is input to a coefficient control device 5701 to control the coefficient k supplied to the coefficient unit 5703. Coefficient control will be described later.

By the above process, an object-dependent level difference is excluded, and a gain error generated by the non uniformity between channels is extracted. The gain error amount is multiplied by a coefficient by a correction amount control device 5504. This coefficient corresponds to the feedback gain of the gain error correction loop. For a large gain, the correction ability is high, but the operation is unstable against disturbance such as erroneous detection. For a small gain, the operation is stable against disturbance, but the correction ability is low.

An output from the correction amount control device 5504 is supplied to a gain correction amount calculation device 5506.

The gain correction amount calculation device 5506 also receives an output from a gain correction characteristic table 5505. The gain correction characteristic table 5505 is a table of gain correction characteristics described above. As illustrated in FIG. 4, a gain correction amount is obtained in correspondence with the gain-up amount.

The gain correction amount calculation device 5506 multiplies these two input signals and the gain-up amount to actually calculate a gain adjustment value for the right channel. The calculated gain adjustment value is supplied to the gain adjustment device 113 shown in FIG. 29. The gain adjustment device 114 receives the gain-up amount.

Signals after gain adjustment are supplied to a frame synthesizing device 115 and the level difference evaluation value generation device 116. The frame synthesizing device 115 synthesizes two signals and outputs the synthesized signal as an image of one frame to a camera signal processing circuit 118 and the camera shake amount detection device 5121. The camera signal processing circuit 118 executes signal processes such as γ correction, color correction, and edge correction, and outputs the resultant signal as an image signal from a terminal 119.

The camera shake amount detection device 5121 detects the amount of camera shake which occurs when the user takes a picture while holding the camera with his hand. The detection result is input to the microcomputer 117. The microcomputer 117 calculates the camera shake correction amount on the basis of the result.

The camera shake correction amount is supplied to the camera signal processing device 118, and the camera signal processing device 118 performs a camera shake correction process. The camera shake correction amount calculation method is not essential to the present invention, and a detailed description thereof will be omitted.

As described above, disturbance factors include an object-dependent level difference in measuring the level difference between right and left frames from a generally photographed image. That is, when an object having a level difference between rectangular regions 203 and 204 is photographed, the level difference cannot be distinguished from a level difference between the regions, and erroneous correction may be done.

Time integration is executed to exclude this factor, as described above, but does not achieve any effect in a situation in which an object at rest is photographed at a fixed angle of view. In order to cope with this situation, the ninth embodiment performs variable control of the correction loop characteristic in accordance with the shake amount (camera shake amount) of the camera.

Figure 32:
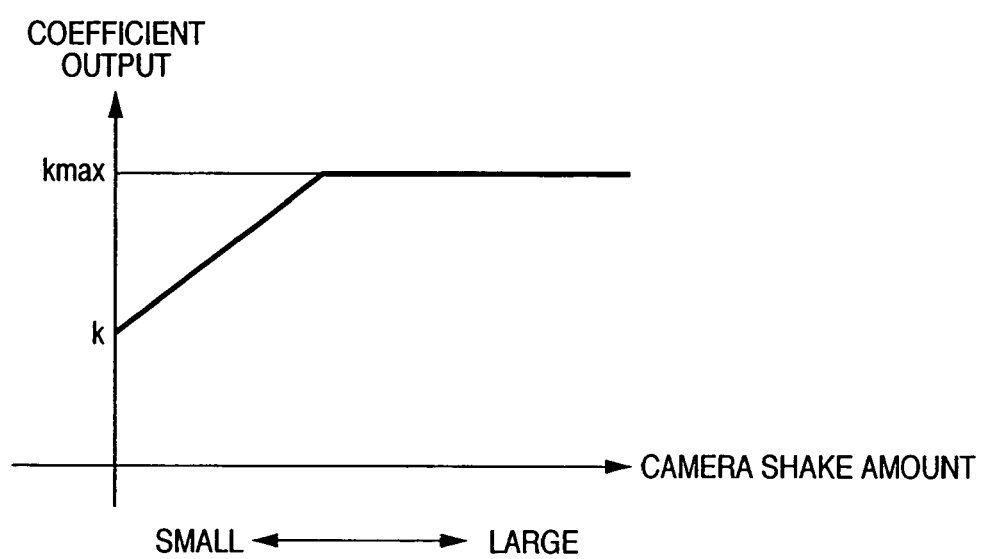
FIG. 32 is a graph showing the coefficient control characteristic of the integration device in the ninth embodiment.

FIG. 32 shows the coefficient control characteristic to the camera shake amount, and represents the operation of the coefficient control device 5701 in FIG. 31. In FIG. 32, the abscissa represents the camera shake amount, and the shake amount increases toward right. The ordinate represents an output coefficient. As the shake amount increases for the output coefficient in an unshaken state, the coefficient value increases.

It is estimated that, when the shake amount is large, the positional relationship between a rectangular region and an object greatly varies. In this situation, an object-dependent level difference can be satisfactorily excluded even with a small number of frames to be averaged. To the contrary, when the shake amount is small or the camera does not shake, the influence of the object-dependent level different is serious, thus the number of frames to be averaged is increased, and stabilization control against disturbance (i.e., object-dependent level difference) is done.

If no shake is detected and the image sensing apparatus is regarded to be fixed to a tripod or the like, no level difference evaluation value may be used by setting the coefficient k to 0.

As described above, according to the ninth embodiment, a correction coefficient which makes the levels of a plurality of image sensing signals equal to each other is determined on the basis of the shake amount detection result, and the level difference between the image sensing signals is adjusted using the determined correction coefficient so as to reduce the level difference. The non uniformity between a plurality of image sensing regions can be corrected in real time.

According to another feature of the ninth embodiment, adaptive control is done in accordance with the shake amount of the image sensing apparatus, and an object-dependent level difference component can be effectively removed. Even when dynamic variations occur, a level difference appearing in an image can be eliminated.

Other Embodiment of Invention

The present invention may be applied to a system comprised of a plurality of devices or an apparatus formed by a single device.

The present invention also includes a case wherein software program codes for realizing the functions of the above-described embodiments are supplied from a storage medium or via a transmission medium such as the Internet to a computer in an apparatus or system connected to various devices so as to operate these devices and realize the functions of the above-described embodiments, and the devices are operated in accordance with the program stored in the computer (CPU or MPU) of the system or apparatus.

In this case, the software program codes realize the functions of the above-described embodiments, and the program codes themselves and a device for supplying the program codes to the computer, for example, a storage medium which stores the program codes constitute the present invention. As the storage medium which stores the program codes, a flexible disk, hard disk, optical disk, magnetooptical disk, CD-ROM, magnetic tape, nonvolatile memory card, or ROM can be used.

The functions of the above-described embodiments are realized when the computer executes the supplied program codes. Also, the functions of the above-described embodiments are realized when the program codes cooperate with an OS (Operating System), another application software, or the like running on the computer. Also in this case, the program codes are included in the embodiments of the present invention.

Moreover, the present invention includes a case in which, after the supplied program codes are stored in the memory of the function expansion board of the computer or the memory of a function expansion unit connected to the computer, the CPU of the function expansion board or function expansion unit performs some or all of actual processes on the basis of the instructions of the program codes and these processes realize the functions of the above-described embodiments.

As many apparently widely different embodiments of the present invention can be made without departing from the spirit and scope thereof, it is to be understood that the invention is not limited to the specific embodiments thereof except as defined in the appended claims.

What is claimed is:

1. A correction apparatus which corrects image sensing signals read out every area from an image sensing element divided into a plurality of areas, comprising:
    a correction coefficient determination device which determines a correction coefficient for correcting a level difference between the image sensing signals read out every area;
    a level adjustment device which adjusts a level of image sensing signal of each area by using the correction coefficient; and
    a composing device which composes the image sensing signals read out every area,
    wherein said correction coefficient determination device determines the correction coefficient based on a ratio of image sensing signals obtained every area in an image sensing signal which is formed by adding a plurality of frames.

2. The apparatus according to claim 1, wherein said correction coefficient determination device determines the correction coefficient on the basis of the ratio of image sensing signals which are not more than a predetermined threshold value.

3. The apparatus according to claim 1, wherein said correction coefficient determination device comprises an evaluation value generation device which generates an evaluation value from a detection result of an output level detection device, an averaging device which averages the evaluation values generated by said evaluation value generation device between a plurality of frames, and a frame count setting device which sets the number of frames to be averaged by said averaging device, and said correction coefficient determination device determines the correction coefficient on the basis of the evaluation value averaged for the number of frames set by said frame count setting device.

4. The apparatus according to claim 3, wherein said averaging device comprises a frame count control device which controls the number of frames to be averaged in accordance with a level of the detection result from said output level detection device.

5. The apparatus according to claim 1 further comprising an output level detection device including an upper/lower limit level setting device which sets an upper limit level and a lower limit level, and said output level detection device selects from the plurality of image sensing signals a signal whose level is lower than the upper limit level and higher than the lower limit level, and generates an output level detection result.

6. The apparatus according to claim 1, further comprising a correction coefficient storage device which stores the correction coefficient in a recording medium, wherein an adjustment value determined on the basis of both the correction coefficient stored in the recording medium and a correction coefficient obtained in real time during image sensing operation is supplied to said level adjustment device to perform adjustment so as to reduce the level difference between the image sensing signals.

7. The apparatus according to claim 6, wherein said correction coefficient storage device stores in the recording medium a correction coefficient determined by said correction coefficient determination device at a predetermined timing.

8. The apparatus according to claim 6, wherein said correction coefficient determination device determines the adjustment value supplied to said level adjustment device by multiplying the correction coefficient stored in the recording medium by the correction coefficient obtained in real time during image sensing operation.

9. An image sensing apparatus comprising a correction apparatus defined in claim 1 and an image sensing element.

10. A correction method of correcting image sensing signals read out every area from an image sensing element divided into a plurality of areas, comprising:

a correction coefficient determination step of determining a correction coefficient for correcting a level difference between the image sensing signals read out every area;

a level adjustment step of adjusting a level of image sensing signal of each area by using the correction coefficient; and a composing step of composing the image sensing signals read out every area, wherein said correction coefficient determination step determines the correction coefficient based on a ratio of image sensing signals obtained every area in an image sensing signal which is formed by adding a plurality of frames.

11. A correction apparatus according to claim 1, wherein said correction coefficient determination device determines the correction coefficient on the basis of temperature information.

12. The apparatus according to claim 11, wherein said correction coefficient determination device comprises an evaluation value generation device which generates an evaluation value from the image sensing signals obtained every area, a gain multiplication device which multiplies by a gain determined in accordance with a temperature around the image sensing element the evaluation value generated by said evaluation value generation device, and said correction coefficient determination device determines the correction coefficient on the basis of the evaluation value multiplied by the gain by said gain multiplication device.

* * * * *